(12) United States Patent
Chen

(10) Patent No.: US 9,829,637 B2
(45) Date of Patent: Nov. 28, 2017

(54) MULTIPLEXER

(71) Applicant: Hisense Broadband Multimedia Technologies Co., Ltd., Qingdao, Shandong (CN)

(72) Inventor: Sixiang Chen, Shandong (CN)

(73) Assignee: Hisense Broadband Multimedia Technologies Co., Ltd., Qingdao (CN)

( * ) Notice: Subject to any disclaimer, the term of this patent is extended or adjusted under 35 U.S.C. 154(b) by 0 days.

(21) Appl. No.: 15/474,478

(22) Filed: Mar. 30, 2017

(65) Prior Publication Data

US 2017/0219775 A1 Aug. 3, 2017

Related U.S. Application Data

(63) Continuation of application No. 14/977,539, filed on Dec. 21, 2015, now Pat. No. 9,645,315.

(30) Foreign Application Priority Data

Feb. 16, 2015 (CN) .......................... 2015 1 0086181

(51) Int. Cl.
*G02B 6/293* (2006.01)
*G02B 6/42* (2006.01)
*G02B 6/27* (2006.01)
*G02B 27/28* (2006.01)
*G02B 27/14* (2006.01)
*G02B 27/10* (2006.01)

(52) U.S. Cl.
CPC ......... *G02B 6/2938* (2013.01); *G02B 6/2706* (2013.01); *G02B 6/4208* (2013.01); *G02B 6/4213* (2013.01); *G02B 6/4215* (2013.01); *G02B 27/1006* (2013.01); *G02B 27/141* (2013.01); *G02B 27/283* (2013.01); *G02B 27/286* (2013.01)

(58) Field of Classification Search
None
See application file for complete search history.

(56) References Cited

U.S. PATENT DOCUMENTS

| | | | | |
|---|---|---|---|---|
| 6,832,018 | B2* | 12/2004 | Abushagur | G02B 6/29365 385/24 |
| 8,625,989 | B2* | 1/2014 | Du | G02B 6/4215 398/43 |
| 8,995,845 | B2* | 3/2015 | Du | H04B 10/40 385/24 |
| 9,419,717 | B2* | 8/2016 | Huang | G01J 1/0271 |

(Continued)

*Primary Examiner* — Jerry M Blevins
*Assistant Examiner* — Erin Chiem
(74) *Attorney, Agent, or Firm* — Brinks Gilson & Lione

(57) ABSTRACT

Embodiments of the present disclosure provide a multiplexer, and relate to the field of fiber communications technologies. The multiplexer according to the embodiments of the present disclosure includes a first light beam adjusting element, a second light beam adjusting element, a first light filtering and combining element or splitting element, a second light filtering and combining element or splitting element, a polarization changing element, and a light polarizing and combining element. The optical multiplexer according to the embodiments of the present disclosure may not only implement combining at least four light beams into one light beam but also reduce the number of reflection times of light during a light combination process.

24 Claims, 11 Drawing Sheets

(56) References Cited

U.S. PATENT DOCUMENTS

| | | | |
|---|---|---|---|
| 9,490,900 B2* | 11/2016 | Saeki | H04B 10/503 |
| 2002/0171931 A1* | 11/2002 | McLeod | G02B 5/3025 |
| | | | 359/484.09 |
| 2009/0052837 A1* | 2/2009 | Safrani | G02F 1/31 |
| | | | 385/16 |
| 2016/0170146 A1* | 6/2016 | Kurokawa | G02B 6/4257 |
| | | | 385/14 |
| 2016/0231581 A1* | 8/2016 | Liu | G02B 27/283 |

* cited by examiner

MULTIPLEXER

CROSS REFERENCE TO RELATED APPLICATION

This application is a continuation application of U.S. patent application Ser. No. 14/977,539 filed on Dec. 21, 2015, which claims priority to Chinese Patent Application No. 201510086181.9 filed on Feb. 16, 2015, the disclosures of which are incorporated herein in its entirety by reference.

TECHNICAL FIELD

The present disclosure relates to the optical communications field, and in particular, to a multiplexer.

BACKGROUND

Currently, a wavelength division multiplexing technology, especially a dense wavelength division multiplexing technology has become one of main technologies used to implement high-speed and large-capacity data transmission in the optical communications field. In order to implement wavelength division multiplexing, a multiplexer is required to combine multiple light beams of different wavelengths into one light beam.

FIG. 1 is a multiplexer provided in the conventional art. As shown in FIG. 1, an existing multiplexer includes a rhombic prism. One side of the rhombic prism is coated with an anti-reflection film and a high reflection film, and four thin-film filters are attached to another side of the rhombic prism. The anti-reflection film improves light transmission, and the high reflection film improves light reflection. Filter characteristics of the thin-film filter make a light beam of a specified wavelength be transmitted and a light beam of a non-specified wavelength be reflected. The four thin-film filters have different filter characteristics from each other.

An incident light beam $\lambda 1$, an incident light beam $\lambda 2$, an incident light beam $\lambda 3$, and an incident light beam $\lambda 4$ are four light beams of specified wavelengths to be combined. The incident light beam $\lambda 1$ enters the rhombic prism from a thin-film filter T1, and is reflected to another thin-film filter T2 at the high reflection film, and then reflected to the high reflection film by the another thin-film filter T2; the incident light beam $\lambda 2$ enters the rhombic prism from the thin-film filter T2; and the incident light beam $\lambda 1$ and $\lambda 2$ are combined into one light beam at the thin-film filter T2.

The combined incident light beam $\lambda 1$ and $\lambda 2$ enter the high reflection film, and is reflected to another thin-film filter T3 at the high reflection film, and then is reflected to the high reflection film by the another thin-film filter T3; the incident light beam $\lambda 3$ enters the rhombic prism from the thin-film filter T3; and the incident light beam $\lambda 1$, $\lambda 2$, and $\lambda 3$ are combined into one light beam at the thin-film filter T3.

The combined incident light beam $\lambda 1$, $\lambda 2$, and $\lambda 3$ enter the high reflection film, and is reflected to another thin-film filter T3 at the high reflection film, and then is reflected to the high reflection film by the another thin-film filter T3; the incident light beam $\lambda 4$ enters the rhombic prism from a thin-film filter T4; the incident light beam $\lambda 1$, $\lambda 2$, $\lambda 3$, and $\lambda 4$ are combined into one light beam at the thin-film filter T4, and the combined incident light beam $\lambda 1$, $\lambda 2$, $\lambda 3$, and $\lambda 4$ enters the anti-reflection film and emerges from the anti-reflection film.

In the foregoing conventional art, although the combining four light beams of different wavelengths into one light beam is implemented, the multiplexer has six optical reflection points, the incident light beam $\lambda 1$ is reflected six times, the incident light beam $\lambda 2$ is reflected four times, and the incident light beam $\lambda 3$ is reflected two times, and thus the four light beams are reflected twelve times totally. The light is reflected for many times in the multiplexer. The light is reflected for many times in the multiplexer, so during a reflection process, the incident light beams $\lambda 1$, $\lambda 2$, $\lambda 3$, and $\lambda 4$ are combined into one beam in sequence, and the four incident light beams are overlapped inside the multiplexer in sequence, which makes that, during a process of implementing light beam combination, an incident position and an incident angle of each incident light beam, and precision of the multiplexer are highly required, and thereby causing difficulties in manufacturing.

SUMMARY

The embodiments of the present disclosure provide a multiplexer, which may not only implement combining at least four light beams into one light beam but also reduce reflection times of light during a light combination process.

To achieve the foregoing objective of the disclosure, the embodiments of the present disclosure adopts the following technical solutions:

A multiplexer according to an embodiment of the present disclosure is configured to combine at least four light beams of different wavelengths emitted from a laser into one light beam, including:

a first light beam adjusting element, where the first light beam adjusting element is configured to adjust propagation directions of a first light beam and a second light beam;

a first light filtering and combing element, where the first light filtering and combing element is configured to combine a third light beam and the first light beam adjusted by the first light beam adjusting element into a fifth light beam;

a second light filtering and combing element, where the second light filtering and combing element is configured to combine a fourth light beam and the second light beam adjusted by the first light beam adjusting element into a sixth light beam;

a polarization state changing element, where the polarization state changing element is configured to change a polarization state of the sixth light beam to output a seventh light beam a second light beam adjusting element, where the second light beam adjusting element is configured to adjust a propagation direction of the fifth light beam or the seventh light beam; and a light polarizing and combing element, where the light polarizing and combing element is configured to combine, after the propagation direction of the fifth light beam or the seventh light beam is adjusted by the second light beam adjusting element, the fifth light beam and the seventh light beam into one light beam.

The multiplexer according to the embodiments of the present disclosure is configured to combine at least four light beams of different wavelengths emitted from the laser into one light beam, where the first light filtering and combing element is configured to combine the third light beam and the first light beam adjusted by the first light beam adjusting element to the fifth light beam; the second light filtering and combing element is configured to combine the fourth light beam and the second light beam adjusted by the first light beam adjusting element to the sixth light beam; the polarization state changing element is configured to change the polarization state of the sixth light beam to output the seventh light beam; and the light polarizing and combing element is configured to combine, after the propagation direction of the fifth light beam or the seventh light beam is adjusted by the second light beam adjusting element, the fifth light beam and the seventh light beam into one light beam. Therefore, the combing at least four light beams into one light beam is implemented.

During a process of combining at least four light beams into one light beam, a light beam is reflected at most four times at the first light beam adjusting element, the first light filtering and combing element or the second light filtering and combing element, the second light beam adjusting element, and the light polarizing and combing element respectively; and a light beam is reflected at least zero time. When the combing at least four light beams into one light beam is implemented, the four light beams are reflected at most eight times, and compared with the conventional art, not only the maximum number of reflection times of a light beam is reduced but also the total number of reflection times of the light beams is reduced, and therefore, the number of reflection times of light during the light combination process is reduced.

BRIEF DESCRIPTION OF THE DRAWINGS

To illustrate the technical solutions in the embodiments of the present disclosure more clearly, the following briefly introduces the accompanying drawings required for describing the embodiments or the conventional art. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by persons of ordinary skill in the art based on the embodiments of the present disclosure without creative efforts shall fall within the protection scope of the present disclosure.

Currently, a wavelength division multiplexing technology, especially a dense wavelength division multiplexing technology has become one of main technologies used to implement high-speed and large-capacity data transmission in the optical communications field. In order to implement wavelength division multiplexing, a multiplexer is required to combine multiple light beams of different wavelengths into one light beam. The multiple beams, for example, may be coupled into a single optical fiber.

Examples of wavelengths and polarization states in the present disclosure do not constitute limitations to the technical solutions protected by the present disclosure. According to the technical solutions provided in the disclosure of the present disclosure, a person skilled in the art may set a wavelength of a light beam and a polarization state of a light beam according to requirements.

Figure 2:
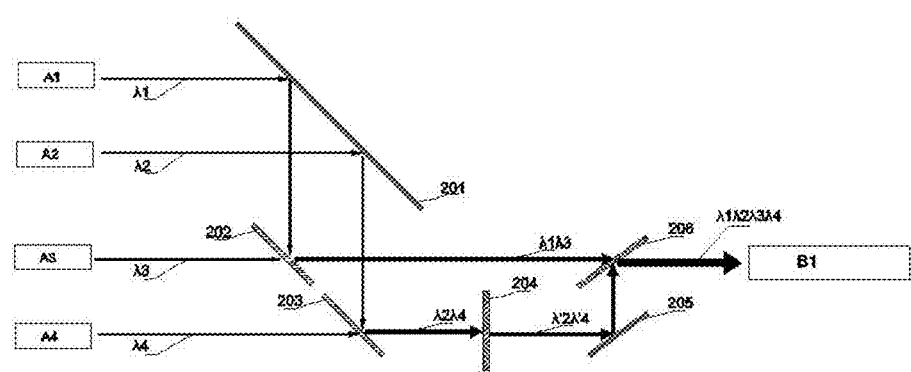
FIG. 2 is a schematic structural diagram of a multiplexer according to an embodiment of the present disclosure.

FIG. 2 is a schematic structural diagram of a multiplexer according to an embodiment of the present disclosure. As shown in FIG. 2, a multiplexer according to the embodiment of the present disclosure is configured to combine at least four light beams of different wavelengths emitted from a laser into one light beam.

For example, a laser emitter A1 emits a first light beam $\lambda 1$ of wavelength $\lambda 1$, a laser emitter A2 emits a second light beam $\lambda 2$ of wavelength $\lambda 2$, a laser emitter A3 emits a third light beam $\lambda 3$ of wavelength $\lambda 3$, a laser emitter A4 emits a fourth light beam $\lambda 4$ of wavelength $\lambda 4$, and by using a multiplexing function of the multiplexer, the finally output combined light beam $\lambda 1$, $\lambda 2$, $\lambda 3$, and $\lambda 4$ enters a fiber B1.

The multiplexer according to the embodiment of the present disclosure includes a first light beam adjusting element 201, a second light beam adjusting element 205, a first light filtering and combing element 202, a second light filtering and combining element 203, a polarization state changing element 204, and a light polarizing and combining element 206.

The multiplexer according to the embodiment of the present disclosure may combine at least four light beams of different wavelengths into one light beam. Because the light emitted from the laser is polarized light, the first light beam λ1, the second light beam λ2, the third light beam λ3, and the fourth light beam λ4 represent four polarized light beams of different wavelengths.

Figure 1:
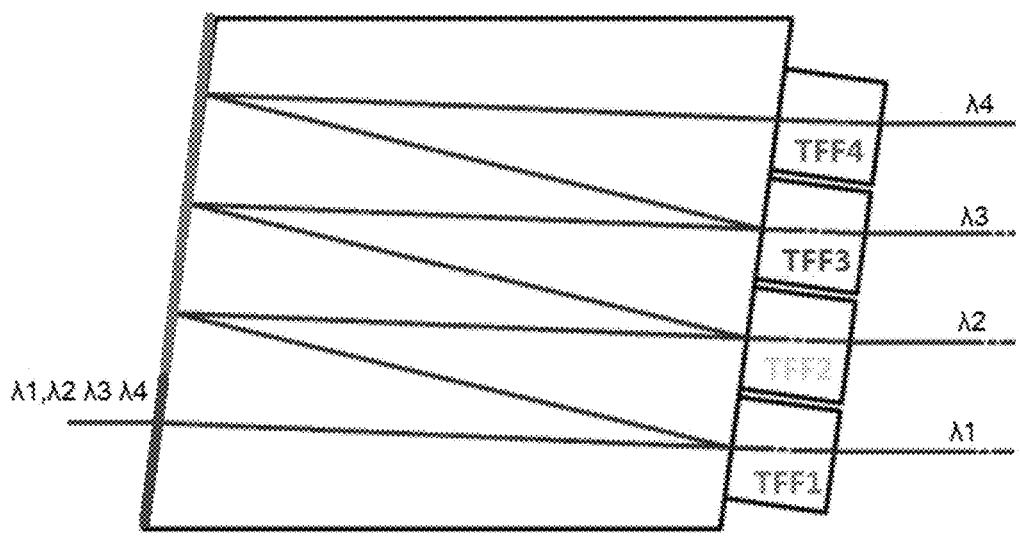
FIG. 1 is a schematic diagram of a structure principle of a multiplexer in the conventional art.

The sequence of the first light beam λ1, the second light beam λ2, the third light beam λ3, and the fourth light beam λ4 is not fixed. The present disclosure uses the sequence shown in FIG. 1 as an example to illustrate the technical solutions provided in the present disclosure.

The first light beam adjusting element 201 is configured to adjust propagation directions of the first light beam A1 and the second light beam λ2, so that the first light beam λ1 is input to the first light filtering and combing element 202, and the second light beam λ2 is input to the second light filtering and combing element 203.

The light beam adjusting element is preferred to be a total reflection film, or may also be a reflection film or a prism, which is not limited in the present disclosure. The light beam adjusting element may be any element that may implement adjusting the light propagation direction. The light propagation direction may be adjusted by using total reflection of light or reflection of light, or may also be adjusted by using refraction of light.

To reduce loss of light energy, a high reflection film may be coated on the light beam adjusting element 201.

The first light filtering and combing element 202 is configured to combine the third light beam λ3 and the first light beam λ1 adjusted by the first light beam adjusting element 201 to a fifth light beam λ1 λ3.

The second light filtering and combing element 203 combines the fourth light beam λ4 and the second light beam λ2 adjusted by the first light beam adjusting element into a sixth light beam λ2λ4.

The light filtering and combining element reflects light beams of some wavelengths and transmits light beams of other wavelengths according to different wavelengths of light beams. Any component satisfying the foregoing characteristics may be the light filtering and combing element.

In the present disclosure, the light filtering and combing element receives two light beams of different wavelengths, where one light beam is reflected by the light filtering and combining element and another light beam is transmitted by the light filtering and combing element.

For example, the first light beam λ1 and the third light beam λ3 are light beams of different wavelengths, and the second light beam λ2 and the fourth light beam λ4 are light beams of different wavelengths. The first light filtering and combing element 202 reflects the first light beam A1 and transmits the third light beam λ3, and the second light filtering and combing element 203 reflects the second light beam λ2 and transmits the fourth light beam λ4.

At the first light filtering and combing element 202, the first light beam λ1 may be reflected by the first light filtering and combing element 202, the third light beam λ3 may be transmitted by the first light filtering and combing element 202, and the reflected first light beam λ1 and the transmitted third light beam λ3 have the same light path, so that combining the first light beam λ1 and the third light beam λ3 into one light beam is implemented; or the first light beam λ1 may be transmitted by the first light filtering and combing element 202, the third light beam λ3 may be reflected by the first light filtering and combing element 202, and the transmitted first light beam λ1 and the reflected third light beam λ3 have the same light path, so that combining the first light beam λ1 and the third light beam λ3 into one light beam is implemented.

At the second light filtering and combing element 203, the second light beam λ2 may be reflected by the second light filtering and combing element 203, the fourth light beam λ4 may be transmitted by the second light filtering and combing element 203, and the reflected second light beam λ2 and the transmitted fourth light beam λ4 have the same light path, so that combining the second light beam λ2 and the fourth light beam λ4 into one light beam is implemented; or the second light beam λ2 may be transmitted by the second light filtering and combing element 203, the fourth light beam λ4 is reflected by the second light filtering and combining element 203, and the transmitted second light beam λ2 and the reflected fourth light beam λ4 have the same light path, so that combining the second light beam λ2 and the fourth light beam λ4 into one light beam is implemented.

In the present disclosure, after entering the first light filtering and combining element 202 at an appropriate angle, the third light beam λ3 and the first light beam λ1 entering the first light filtering and combining element 202 are just combined into one light beam; and after entering the second light filtering and combining element 203 at an appropriate angle, the fourth light beam λ4 and the second light beam λ2 entering the second light filtering and combining element 203 are just combined into one light beam.

The at least four light beams need to be combined by the multiplexer are light beams of different wavelengths, and two light beams combined by the light filtering and combining element meet wavelength requirements of the light filtering and combining element for reflecting and transmitting light.

The first light beam adjusting element 201 is configured to adjust the propagation directions of the first light beam λ1 and the second light beam λ2, so that the first light beam A1 is input to the first light filtering and combing element 202, and the second light beam λ2 is input to the second light filtering and combing element 203; the third light beam λ3 may be input to the first light filtering and combining element 202 directly, or may be input to the first light filtering and combining element 202 after the propagation direction of the third light beam λ3 is adjusted by another component; and the fourth light beam λ4 may be input to the second light filtering and combining element 203 directly, or may be input to the second light filtering and combining element 203 after the propagation direction of the fourth light beam λ4 is adjusted by another component.

The light filtering and combining element may be a thin-film filter. According to the difference between wavelengths of reflection light and transmission light, the thin-film filter may be a high-transmission and low-reflection thin-film filter, or may be a low-transmission and high-reflection thin-film filter.

The polarization state changing element 204 is configured to change a polarization state of the sixth light beam λ2λ4 to output a seventh light beam. After the polarization state of the sixth light beam λ2λ4 is changed, the seventh light beam λ'2λ'4 is obtained.

The polarization state changing element 204 may be a granting, a wave plate, or a half-wave plate. Any component that may change the light polarization direction may be a polarization state changing element 204.

Two light beams combined by the light polarizing and combining element 206 meets polarization state requirements of the light polarizing and combining element 206 for reflecting and transmitting light.

The second light beam adjusting element 205 is configured to adjust a propagation direction of the fifth light beam λ1 λ3 or the seventh light beam λ'2λ'4, so that the fifth light beam λ1 λ3 or the seventh light beam λ'2λ'4 is input to the light polarizing and combining element 206.

Polarization states of some light beams of multiple light beams formed after light combination performed by the light filtering and combining element are changed by the polarization state changing element 204, so that multiple types of light in different polarization states are formed. Each type of light includes at least one light beam. For example, a polarization state of the fifth light beam λ1 λ3 and a polarization state of the seventh light beam λ'2λ'4 are perpendicular to each other.

The second light beam adjusting element 205 is configured to change a propagation direction of any one type of light of the multiple types of light in different polarization states. For example, the second light beam adjusting element 205 is configured to adjust the propagation direction of the seventh light beam λ'2A λ4, so that the seventh light beam λ'2λ'4 is input to the light polarizing and combining element 206.

The first light beam adjusting element 201 and the second light beam adjusting element 205 may use specific same components, or may use specific different components. In a specific implementation process, if names of specific components are the same, the specific components should not be considered the same.

The light polarizing and combining element 206 is configured to combine the fifth light beam and the seventh light beam into one light beam λ1 λ2A λ3 λ4.

In the embodiment of the present disclosure, the light polarizing and combining element 206 is disposed on a light path of the fifth light beam λ1 λ3 output by the first light filtering and combining element 202, while the second light beam adjusting element 205 is disposed on a light path of the seventh light beam λ'2λ'4 output by the polarization state changing element 204 to change the propagation direction of the seventh light beam to make the seventh light beam input to the light polarizing and combining element 206.

The light polarizing and combining element 206 may reflect light of some polarization directions and transmit light of other polarization directions according to different light polarization directions. Any specific component satisfying the foregoing characteristics may be the light polarizing and combining element 206. The light polarizing and combining element 206 may be a polarization beam combiner (PBC).

Light beams of different wavelengths enter the light filtering and combining element from two sides of the light filtering and combining element respectively, and the light filtering and combining element transmits light beams of some wavelengths and reflects light beams of other wavelengths, so that the light beams transmitted or reflected by the light filtering and combining element are located at one side of the light filtering and combining element. By controlling angles of light beams of different wavelengths entering the light filtering and combining element, the light beams transmitted or reflected by the light filtering and combining element may be combined into one light beam at one side of the light filtering and combining element.

Two light beams of different wavelengths may be combined into one light beam by using the foregoing design. Four light beams of different wavelengths may be combined into two light beams by reusing the foregoing design.

The light emitted from the laser is polarized light, and the foregoing light combination according to wavelengths does not change the polarization state of each light beam, so the foregoing two light beams still remain their original polarization states. One light beam of the two light beams is adjusted by using the polarization state changing element 204, so that the polarization states of the two light beams are different.

The light beams in different polarization states enter the light polarizing and combining element 206 from two sides of the light polarizing and combining element 206, and the light polarizing and combining element 206 transmits light beams in a polarization state and reflects light beams in other polarization states, so that the light beams transmitted or reflected by the light polarizing and combining element 206 are located at one side of the light polarizing and combining element 206. By controlling angles of light beams in different polarization states entering the light polarizing and combining element 206, the light beams transmitted or reflected by the light polarizing and combining element 206 may be combined into one light beam at one side of the light polarizing and combining element 206.

Two light beams in different polarization states may be combined into one light beam by using the foregoing design.

The first light beam adjusting element 201 make light beams of different wavelengths locate at two sides of the light filtering and combining element by changing the propagation direction of the light beam; and the second light beam adjusting element 205 make light beams in different polarization states locate at two side of the light polarizing and combining element 206 by changing the propagation direction of the light beam.

The four light beams of different wavelengths emitted from the laser are combined into one light beam through an interaction among the first light beam adjusting element 201, the first light filtering and combining element 202, the second light filtering and combining element 203, the polarization state changing element 204, the second light beam adjusting element 205, and the light polarizing and combining element 206.

To reduce loss of light energy, a high reflection film is coated on the second light beam adjusting element 205, so as to strengthen light reflection.

Because the sequence of the first light beam, the second light beam, the third light beam, and the fourth light beam is not fixed, any one light beam of multiple light beams formed after the light combination performed by multiple light filtering and combining elements may be the sixth light beam, and any one of other light beams may be the fifth light beam. The light beam sequence shown in the accompany drawings of the present disclosure cannot be understood as limitations to the technical solutions of the present disclosure.

During a process of combining at least four light beams into one light beam, the second light beam is reflected most times. The second light beam is reflected four times at the first light beam adjusting element 201, the second light filtering and combining element 203, the second light beam adjusting element 205, and the light polarizing and combing element 206 respectively; and the third light beam is reflected zero time. When the combing four light beams into one light beam is implemented, the four light beams are reflected at most eight times, and compared with the conventional art, not only the maximum number of reflection times of a light beam is reduced but also the total number of reflection times of the light beams are reduced, and therefore, the number of reflection times of the light beams during the light combination process is reduced.

Figure 3:
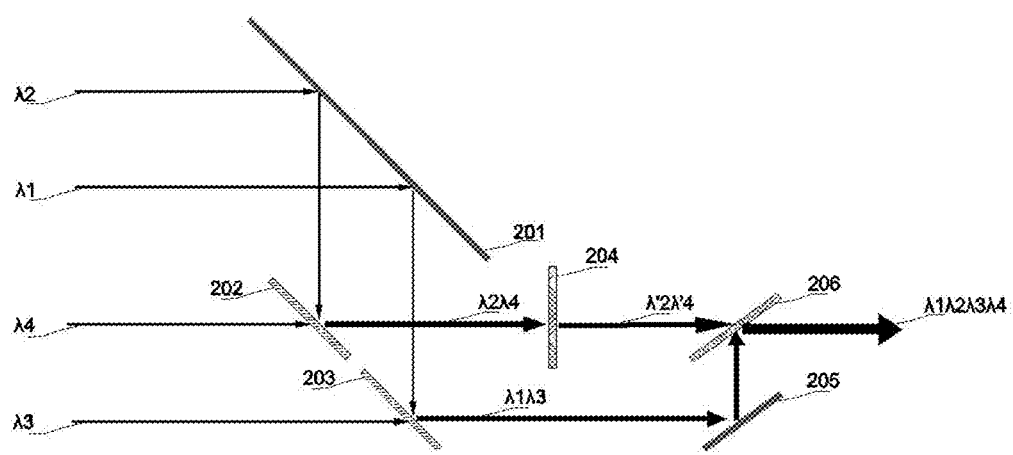
FIG. 3 is a schematic structural diagram of another multiplexer according to an embodiment of the present disclosure.

FIG. 3 is a schematic structural diagram of another multiplexer according to an embodiment of the present disclosure. As shown in FIG. 3, the sequence of incident lights of the multiplexer according to the embodiment of the present disclosure is different from that in FIG. 2. According to the technical solutions provided in the present disclosure, a person skilled in the art may set an appropriate light beam sequence according to requirements. Specific light beam sequences provided in the accompany drawings of the present disclosure cannot be understood as limitations to the protection scope of the present disclosure.

Figure 4:
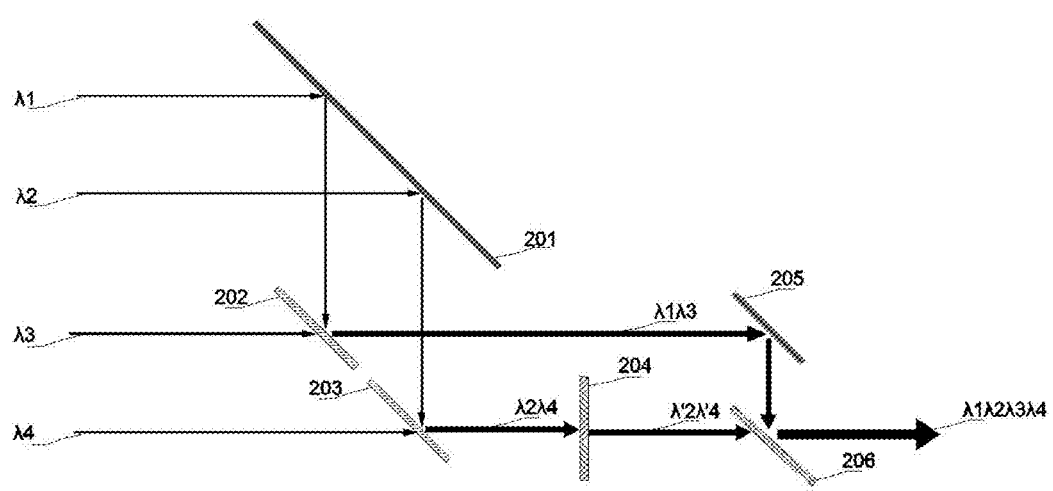
FIG. 4 is a schematic structural diagram of another multiplexer according to an embodiment of the present disclosure.

FIG. 4 is a schematic structural diagram of another multiplexer according to an embodiment of the present disclosure. As shown in FIG. 4, the multiplexer according to the embodiment of the present disclosure includes a first light beam adjusting element 201, a second light beam adjusting element 205, a first light filtering and combing element 202, a second light filtering and combining element 203, a polarization state changing element 204, and a light polarizing and combining element 206.

For example, the second light beam adjusting element 205 is configured to adjust a propagation direction of a fifth light beam $\lambda 1\ \lambda 3$, so that the fifth light beam $\lambda 1\ \lambda 3$ is input to the light polarizing and combining element 206.

The polarization state changing element 204 changes polarization states of a second light beam $\lambda 2$ and a fourth light beam M to obtain a seventh light beam $\lambda 2 \lambda' 4$.

The light polarizing and combining element 206 is disposed on a light path of the seventh light beam $\lambda 2 \lambda' 4$ output by the polarization state changing element 204, while the second light beam adjusting element 205 is disposed on a light path of the fifth light beam $\lambda 1\ \lambda 3$ output by the first light filtering and combining element 202 to change the propagation direction of the fifth light beam to make the fifth light beam input to the light polarizing and combining element 206.

Figure 5:
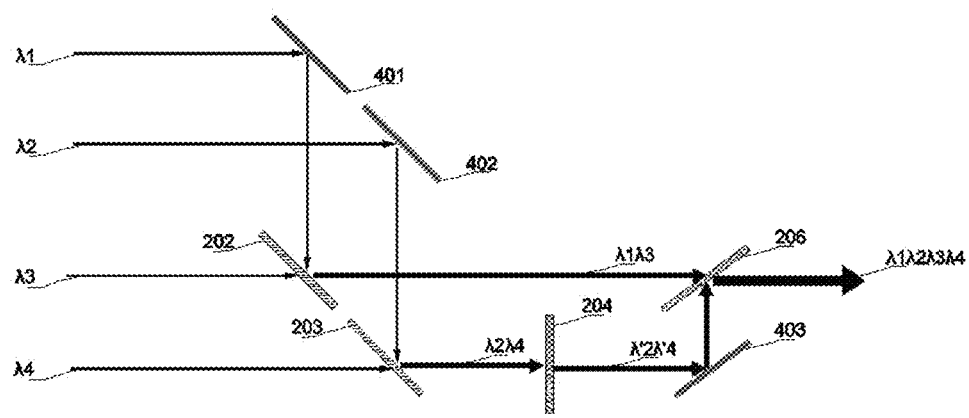
FIG. 5 is a schematic structural diagram of another multiplexer according to an embodiment of the present disclosure.

FIG. 5 is a schematic structural diagram of another multiplexer according to an embodiment of the present disclosure. As shown in FIG. 5, the multiplexer according to the embodiment of the present disclosure includes a first light beam changing element, a first light filtering and combining element 202, a second light filtering and combining element 203, a polarization state changing element 204, a third light beam adjusting element 403, and a light polarizing and combining element 206, where the first light beam adjusting element includes a first subelement 401 and a second subelement 402.

The multiplexer according to the embodiment of the present disclosure may combine at least four light beams of different wavelengths into one light beam. Because light emitted from a laser is polarized light, a first light beam $\lambda 1$, a second light beam $\lambda 2$, a third light beam $\lambda 3$, and a fourth light beam $\lambda 4$ represent four polarized light beams of different wavelengths.

The sequence of the first light beam $\lambda 1$, the second light beam $\lambda 2$, the third light beam $\lambda 3$, and the fourth light beam $\lambda 4$ is not fixed. The present disclosure uses the sequence shown in FIG. 1 as an example to illustrate the technical solutions provided in the present disclosure.

The first subelement 401 adjusts a propagation direction of the first light beam $\lambda 1$, so that the first light beam $\lambda 1$ is input to the first light filtering and combining element 202; and the second subelement 402 adjusts a propagation direction of the second light beam $\lambda 2$, so that the second light beam $\lambda 2$ is input to the second light filtering and combining element 203.

The light beam adjusting element is preferred to be a total reflection film, or may also be a reflection film or a prism, which is not limited in the present disclosure. The light beam adjusting element may be any element that may implement adjusting the light propagation direction. The light propagation direction may be adjusted by using total reflection of light or reflection of light, or may also be adjusted by using refraction of light.

To reduce loss of light energy, a high reflection film may be coated on the light beam adjusting element.

The first light filtering and combining element 202 is configured to combine the first light beam $\lambda 1$ and the third light beam $\lambda 3$ into a fifth light beam $\lambda 1\ \lambda 3$.

The second light filtering and combining element 203 is configured to combine the second light beam $\lambda 2$ and the fourth light beam $\lambda 4$ into a sixth light beam $\lambda 2 \lambda 4$.

The light filtering and combining element reflects light beams of some wavelengths and transmits light beams of other wavelengths according to different wavelengths of light beams. Any component satisfying the foregoing characteristics may be the light filtering and combing element.

In the present disclosure, the light filtering and combing element receives two light beams of different wavelengths, where one light beam is reflected by the light filtering and combining element and another light beam is transmitted by the light filtering and combing element.

For example, the first light beam $\lambda 1$ and the third light beam $\lambda 3$ are light beams of different wavelengths, and the second light beam $\lambda 2$ and the fourth light beam $\lambda 4$ are light beams of different wavelengths. The first light filtering and combing element 202 reflects the first light beam $\lambda 1$ and transmits the third light beam $\lambda 3$, and the second light filtering and combing element 203 reflects the second light beam $\lambda 2$ and transmits the fourth light beam $\lambda 4$.

At the first light filtering and combing element 202, the first light beam $\lambda 1$ may be reflected by the first light filtering and combing element 202, the third light beam $\lambda 3$ may be transmitted by the first light filtering and combing element 202, and the reflected first light beam $\lambda 1$ and the transmitted third light beam $\lambda 3$ have the same light path, so that combining the first light beam $\lambda 1$ and the third light beam $\lambda 3$ into one light beam is implemented; or the first light beam $\lambda 1$ may be transmitted by the first light filtering and combining element 202, the third light beam $\lambda 3$ may be reflected by the first light filtering and combining element 202, and the transmitted first light beam $\lambda 1$ and the reflected third light beam $\lambda 3$ have the same light path, so that combining the first light beam A1 and the third light beam $\lambda 3$ into one light beam is implemented.

At the second light filtering and combing element 203, the second light beam $\lambda 2$ may be reflected by the second light filtering and combing element 203, the fourth light beam $\lambda 4$ may be transmitted by the second light filtering and combing element 203, and the reflected second. light beam $\lambda 2$ and the transmitted fourth light beam $\lambda 4$ have the same light path, so that combining the second light beam $\lambda 2$ and the fourth light beam $\lambda 4$ into one light beam is implemented; or the second light beam $\lambda 2$ may be transmitted by the second light filtering and combing element 203, the fourth light beam $\lambda 4$ is reflected by the second light filtering and combining element 203, and the transmitted second light beam $\lambda 2$ and the reflected fourth light beam $\lambda 4$ have the same light path, so that combining the second light beam $\lambda 2$ and the fourth light beam $\lambda 4$ into one light beam is implemented.

In the present disclosure, after entering the first light filtering and combining element 202 at an appropriate angle, the third light beam $\lambda 3$ and the first light beam $\lambda 1$ entering the first light filtering and combining element 202 are just combined into one light beam; and after entering the second light filtering and combining element 203 at an appropriate angle, the fourth light beam $\lambda 4$ and the second light beam $\lambda 2$ entering the second light filtering and combining element 203 are just combined into one light beam.

The at least four light beams need to be combined by the multiplexer are light beams of different wavelengths, and two light beams combined by the light filtering and combining element meet wavelength requirements of the light filtering and combining element for reflecting and transmitting light.

The first subelement 401 is configured to adjust the propagation direction of the first light beam λ1, so that the first light beam λ1 is input to the first light filtering and combing element 202, and the second subelement 402 is configured to adjust the propagation direction of the second light beam λ2, so that the second light beam λ2 is input to the second light filtering and combing element 203; the third light beam λ3 may be input to the first light filtering and combining element 202 directly, or may be input to the first light filtering and combining element 202 after the propagation direction of the third light beam λ3 is adjusted by another component; and the fourth light beam λ4 may be input to the second light filtering and combining element 203 directly, or may be input to the second light filtering and combining element 203 after the propagation direction of the fourth light beam λ4 is adjusted by another component.

The light filtering and combining element may be a thin-film filter. According to the difference between wavelengths of reflection light and transmission light, the thin-film filter may be a high-transmission and low-reflection thin-film filter, or may be a low-transmission and high-reflection thin-film filter.

The polarization state changing element 204 is configured to change a polarization state of the sixth light beam λ2λ4, and after the polarization state of the sixth light beam is changed, a seventh light beam λ'2λ'4 is obtained.

Because the sequence of the first light beam, the second light beam, the third light beam, and the fourth light beam is not fixed, any one light beam of multiple light beams formed after the light combination performed by multiple light filtering and combining elements may be the sixth light beam, and any one of other light beams may be the fifth light beam. The light beam sequence shown in the accompany drawings of the present disclosure cannot be understood as limitations to the technical solutions of the present disclosure.

The polarization state changing element 204 may be a granting, a wave plate, or a half-wave plate. Any component that may change the light polarization direction may be a polarization state changing element 204.

Two light beams combined by the light polarizing and combining element 206 meets polarization state requirements of the light polarizing and combining element 206 for reflecting and transmitting light.

The third light beam adjusting element 403 is configured to adjust a propagation direction of the fifth light beam λ1 λ3 or the seventh light beam λ'2λ'4, so that the fifth light beam λ1 λ3 or the seventh light beam λ'2λ'4 is input to the light polarizing and combining element 206.

Polarization states of some light beams of multiple light beams formed after light combination performed by the light filtering and combining element are changed by the polarization state changing element 204, so that multiple types of light in different polarization states are formed. Each type of light includes at least one light beam. For example, a polarization state of the fifth light beam λ1 λ3 and a polarization state of the seventh light beam λ'2λ'4 are perpendicular to each other.

The third light beam adjusting element 403 is configured to change a propagation direction of any one type of light of the multiple types of light in different polarization states. For example, the third light beam adjusting element 403 is configured to adjust the propagation direction of the seventh light beam λ'2λ'4, so that the seventh light beam λ'2λ'4 is input to the light polarizing and combining element 206.

The first subelement 401, the second subelement 402, and the third light beam adjusting element 403 may use specific same components, or may use specific different components. In a specific implementation process, if names of specific components are the same, the specific components should not be considered the same.

The light polarizing and combining element 206 is configured to combine the fifth light beam and the sixth light beam into one light beam λ1 λ2λ3 λ4.

In the embodiment of the present disclosure, the light polarizing and combining element 206 is disposed on a light path of the fifth light beam λ1 λ3 output by the first light filtering and combining element 202, while the third light beam adjusting element 403 is disposed on a light path of the seventh light beam λ2λ'4 output by the polarization state changing element 204 to change the propagation direction of the seventh light beam to make the seventh light beam input to the light polarizing and combining element 206.

The light polarizing and combining element 206 may reflect light of some polarization directions and transmit light of other polarization directions according to different light polarization directions. Any specific component satisfying the foregoing characteristics may be the light polarizing and combining element 206. The light polarizing and combining element 206 may be a polarization beam combiner (PBC).

Light beams of different wavelengths enter the light filtering and combining element from two sides of the light filtering and combining element respectively, and the light filtering and combining element transmits light beams of some wavelengths and reflects light beams of other wavelengths, so that the light beams transmitted or reflected by the light filtering and combining element are located at one side of the light filtering and combining element. By controlling angles of light beams of different wavelengths entering the light filtering and combining element, the light beams transmitted or reflected by the light filtering and combining element may be combined into one light beam at one side of the light filtering and combining element.

Two light beams of different wavelengths may be combined into one light beam by using the foregoing design. Four light beams of different wavelengths may be combined into two light beams by reusing the foregoing design.

The light emitted from the laser is polarized light, and the foregoing light combination according to wavelengths does not change the polarization state of each light beam, so the foregoing two light beams still remain their original polarization states. One light beam of the two light beams is adjusted by using the polarization state changing element 204, so that the polarization states of the two light beams are different.

The light beams in different polarization states enter the light polarizing and combining element 206 from two sides of the light polarizing and combining element 206, and the light polarizing and combining element 206 transmits light beams in a polarization state and reflects light beams in other polarization states, so that the light beams transmitted or reflected by the light polarizing and combining element 206 are located at one side of the light polarizing and combining element 206. By controlling angles of light beams in different polarization states entering the light polarizing and combining element 206, the light beams transmitted or reflected by the light polarizing and combining element 206 may be combined into one light beam at one side of the light polarizing and combining element 206.

Two light beams in different polarization states may be combined into one light beam by using the foregoing design.

The first subelement 401 and the second subelement 402 make light beams of different wavelengths locate at two sides of the light filtering and combining element by changing the propagation directions of the light beams; and the third light beam adjusting element 403 make light beams in different polarization states locate at two side of the light polarizing and combining element 206 by changing the propagation directions of the light beams.

The four light beams of different wavelengths emitted from the laser are combined into one light beam through an interaction among the first subelement 401, the second subelement 402, the first light filtering and combining element 202, the second light filtering and combining element 203, the polarization state changing element 204, the third light beam adjusting element 403, and the light polarizing and combining element 206.

To reduce loss of light energy, a high reflection film is coated on the third light beam adjusting element 403, so as to strengthen light reflection.

Figure 6:
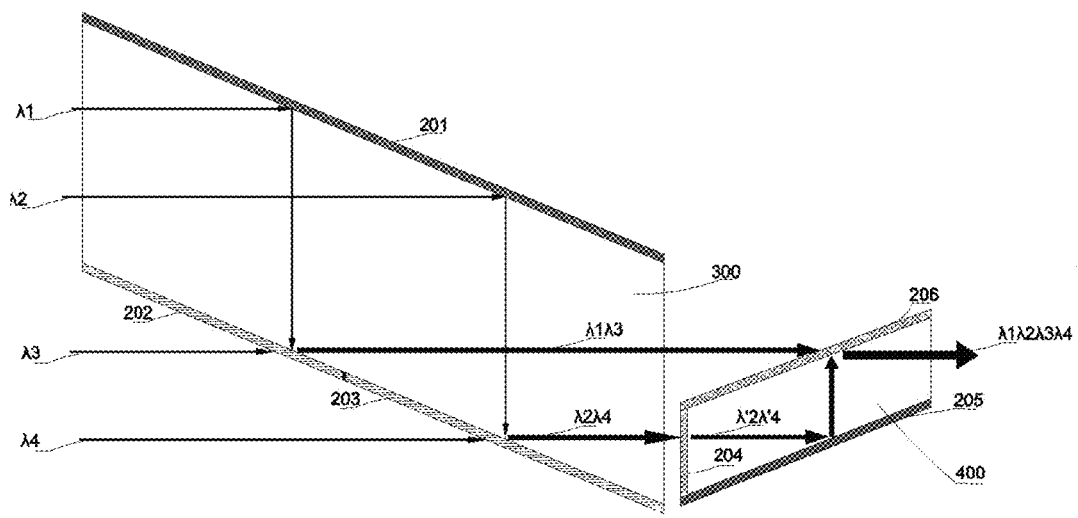
FIG. 6 is a schematic structural diagram of another multiplexer according to an embodiment of the present disclosure.

FIG. 6 is a schematic structural diagram of another multiplexer according to an embodiment of the present disclosure. As shown in FIG. 6, the multiplexer according to the embodiment of the present disclosure includes a first illuminator 300 and a second illuminator 400, where a first light beam adjusting element 201, a first light filtering and combining element 202, and a second light filtering and combining element 203 are attached on a surface of the first illuminator 300, and a polarization state changing element 204, a second light beam adjusting element 205, and a light polarizing and combining element 206 are attached on a surface of the second illuminator 400.

According to a multiplexer solution shown in any one accompany drawing of FIG. 2 to FIG. 5, a design of changing a light path thereof may be applied to the multiplexer shown in FIG. 6, and accordingly, forms that may be presented in FIG. 6 all belong to the scope protected by the present disclosure.

For example, the multiplexer shown in FIG. 6 further includes an anti-reflection element. The anti-reflection element is attached on the surface of the first illuminator and is configured to improve transmission of a first light beam, a second light beam, a fifth light beam, and a sixth light beam.

Figure 7:
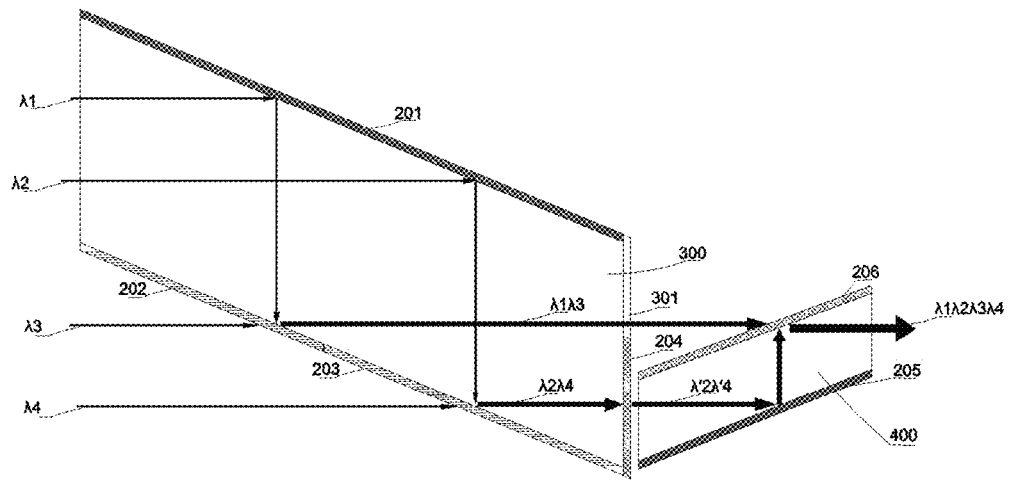
FIG. 7 is a schematic structural diagram of another multiplexer according to an embodiment of the present disclosure.

FIG. 7 is a schematic structural diagram of another multiplexer according to an embodiment of the present disclosure. As shown in FIG. 7, the multiplexer according to the embodiment of the present disclosure includes a first illuminator 300 and a second illuminator 400, where a first light beam adjusting element 201, a first light filtering and combining element 202, and a polarization state changing element 204 are attached on a surface of the first illuminator 300, and a second light beam adjusting element 205 and a light polarizing and combining element 206 are attached on a surface of the second illuminator 400.

In addition, the first illuminator 300 further includes an anti-reflection element 301. The anti-reflection element 301 is configured to improve transmission of a fifth light beam λ1 λ3.

According to a multiplexer solution shown in any one accompany drawing of FIG. 2 to FIG. 5, a design of changing a light path thereof may be applied to the multiplexer shown in FIG. 7, and accordingly, forms that may be presented in FIG. 7 all belong to the scope protected by the present disclosure.

Figure 8:
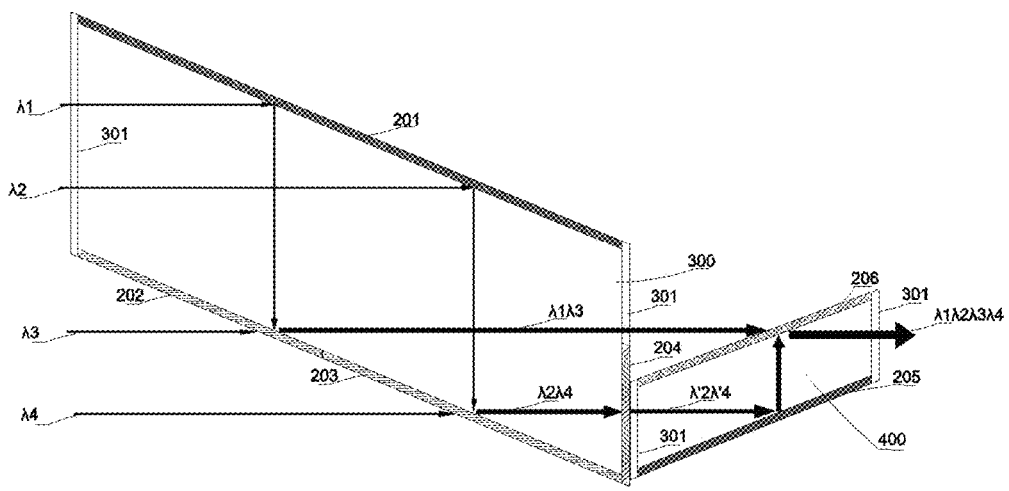
FIG. 8 is a schematic structural diagram of another multiplexer according to an embodiment of the present disclosure.

FIG. 8 is a schematic structural diagram of another multiplexer according to an embodiment of the present disclosure. As shown in FIG. 8, the multiplexer according to the embodiment of the present disclosure includes a first illuminator 300 and a second illuminator 400, where a first light beam adjusting element 201, a first light filtering and combining element 202, a second light filtering and combining element 203, and a polarization state changing element 204 are attached on a surface of the first illuminator 300, and a second light beam adjusting element 205 and a light polarizing and combining element 206 are attached on a surface of the second illuminator 400.

In addition, the first illuminator 300 further includes an anti-reflection element 301, and the second illuminator 400 further includes an anti-reflection element 301. The anti-reflection element 301 is configured to improve light transmission.

According to a multiplexer solution shown in any one accompany drawing of FIG. 2 to FIG. 5, a design of changing a light path thereof may be applied to the multiplexer shown in FIG. 8, and accordingly, forms that may be presented in FIG. 8 all belong to the scope protected by the present disclosure.

As the multiplexer shown in any one accompany drawing of FIG. 6 to FIG. 8, for example, the first illuminator may be a prism, and optical films of different functions are coated on each surface of the prism, so as to implement optical functions of the first light beam adjusting element, the first light filtering and combining element, and the second light filtering and combining element respectively; and the second illuminator may be a prism, and optical films of different functions are coated on each surface of the prism, so as to implement optical functions of the polarization state changing element, the second light beam adjusting element, and the light polarizing and combining element.

Figure 9:
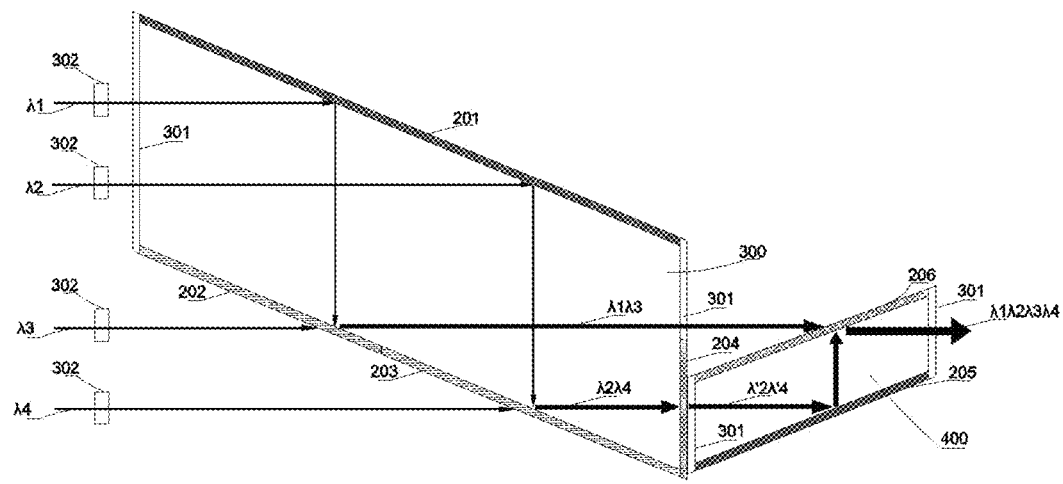
FIG. 9 is a schematic structural diagram of another multiplexer according to an embodiment of the present disclosure.

FIG. 9 is a schematic structural diagram of another multiplexer according to an embodiment of the present disclosure. As shown in FIG. 9, the multiplexer according to the embodiment of the present disclosure further includes four collimation elements. The four collimation elements are located at light paths of four light beams input to the multiplexer respectively, and each collimation element is configured to perform a collimation function on a light beam on the light path where the collimation element is located, which results in better directivity and more focused light energy of the collimated light beam. In another embodiment, the four collimation elements may be all collimation lenses. The collimation element may for example be located at any location on the four light paths, and is preferred to be located at an input end accessory of the multiplexer. The embodiment of the present disclosure does not limit the relative location relationship among the collimation element, the first light filtering and combining element 202, and the second light filtering and combining element 203.

In another embodiment, the multiplexer provided in the present disclosure further includes an optical isolator. The optical isolator is located at a light path of light output by the light polarizing and combining element 206 and is configured to reduce return loss.

For example, as shown in FIG. 9, the multiplexer further includes: a first collimation element, configured to collimate, before a first light beam is input to the first light beam adjusting element, the first light beam;

a second collimation element, configured to collimate, before a second light beam is input to the first light beam adjusting element, the second light beam;

a third collimation element, configured to collimate, before a third light beam is input to the first light filtering and combining element, the third light beam; and a fourth collimation element, configured to collimate, before a fourth light beam is input to the second light filtering and combining element, the fourth light beam.

By collimating light, a propagation route of the light may be optimized, which ensures that the light is propagated in a straight line and facilitates controlling a propagation angle of the light.

Figure 10:
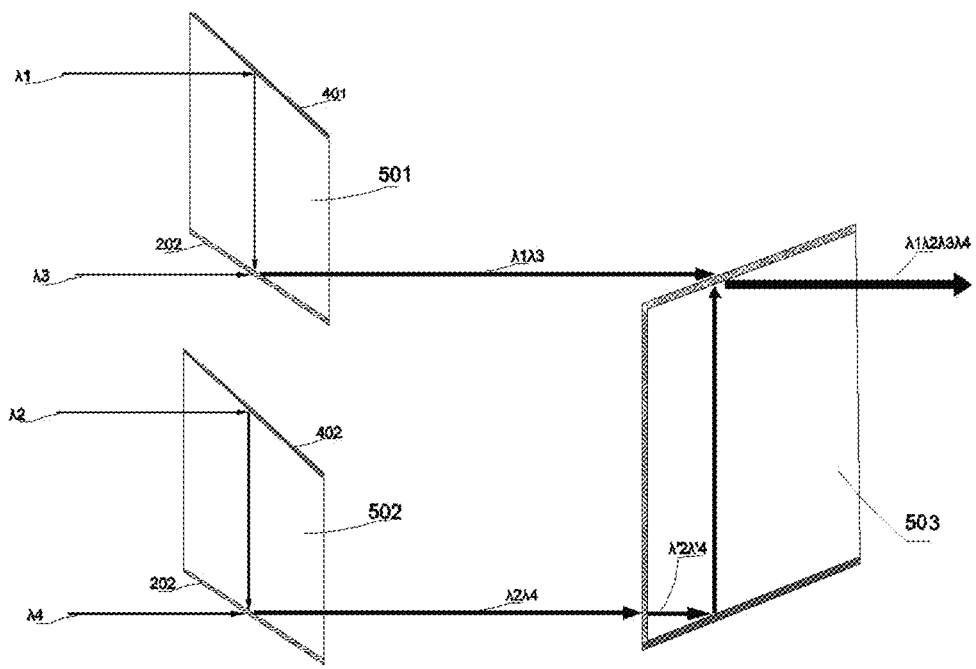
FIG. 10 is a schematic structural diagram of another multiplexer according to an embodiment of the present disclosure.

FIG. 10 is a structural diagram of another multiplexer according to an embodiment of the present disclosure. As shown in FIG. 10, the multiplexer according to the embodiment of the present disclosure includes a first illuminator 501, a second illuminator 502, and a third illuminator 503, where a first subelement 401 and a first light filtering and combining element 202 are attached on a surface of the first illuminator 501, a second subelement 402 and a second light filtering and combining element 203 are attached on a surface of the second illuminator 502, and a polarization state changing element 204, a third light beam adjusting element 403, and a light polarizing and combining element 206 are attached on a surface of the third illuminator 503.

For example, the multiplexer shown in FIG. 10 further includes: a first anti-reflection element, where the first anti-reflection element is attached on the surface of the first illuminator 501 and is configured to improve transmission of a first light beam and a fifth light beam; and a second anti-reflection element, where the second anti-reflection element is attached on the surface of the second illuminator 502 and is configured to improve transmission of a second light beam and a sixth light beam.

Figure 11:
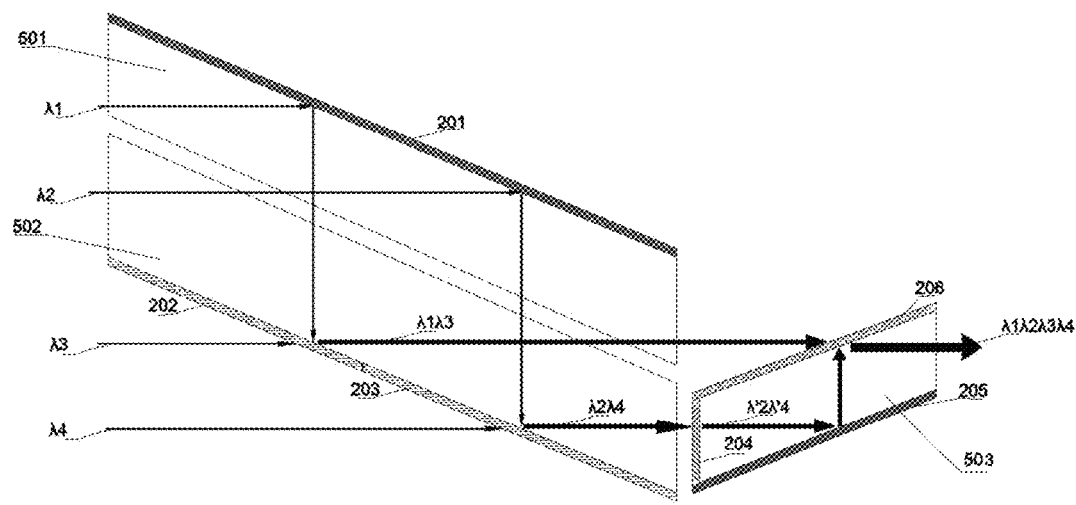
FIG. 11 is a schematic structural diagram of another multiplexer according to an embodiment of the present disclosure. For FIGS. 1-11, a first light beam $\lambda 1$, a second light beam $\lambda 2$, a third light beam $\lambda 3$, a fourth light beam $\lambda 4$, a first light beam adjusting element 201, a laser emitter $\lambda 1$, a laser emitter A2, a laser emitter A3, a laser emitter A4, a fiber B1, a first light filtering and combing element 202, a second light filtering and combing element 203, a polarization state changing element 204, a second light beam adjusting element 205, a light polarizing and combing element 206, a first subelement 401, a second subelement 402, a third light beam adjusting element 403, a first illuminator 300, a second illuminator 400, an anti-reflection element 301, a collimation element 302, a first illuminator 501, a second illuminator 502, and a third illuminator 503.

FIG. 11 is a structural diagram of another multiplexer according to an embodiment of the present disclosure. As shown in FIG. 11, the multiplexer according to the embodiment of the present disclosure includes a first illuminator 501, a second illuminator 502, and a third illuminator 503, where a first light beam adjusting element 201 is attached on a surface of the first illuminator 501, a first light filtering and combining element 202 and a second light filtering and combining element 203 are attached on a surface of the second illuminator 502, and a polarization state changing element 204, a second light beam adjusting element 205, and a light polarizing and combining element 206 are attached on a surface of the third illuminator 503.

For example, the multiplexer shown in FIG. 11 further includes: a first anti-reflection element, where the first anti-reflection element is attached on the surface of the first illuminator 501 and is configured to improve transmission of a first light beam, a second light beam, and a fifth light beam; and a second anti-reflection element, where the second anti-reflection element is attached on the surface of the second illuminator 502 and is configured to improve transmission of a first light beam, a second light beam, and a sixth light beam.

In another set of embodiments, the beam combining element 202 and/203 may be replaced by a beam splitting element. An additional beam absorption element may be further include.

These embodiments are described in FIGS. 12-21 and in detail below. The labeling and numbering for various elements and input and output laser beams below are refreshed from the description of FIGS. 2-11.

A multiplexer according to an embodiment of the present disclosure is configured to combine at least four light beams into one light beam, where the multiplexer includes a light beam adjusting element, a light splitting element, and a light beam combining element.

The multiplexer according to the embodiment of the present disclosure may combine at least four light beams of different wavelengths into one light beam. Because light emitted from a laser is polarized light, a first light beam, a second light beam, a third light beam, and a fourth light beam represent four polarized light beams of different wavelengths.

The sequence of the first light beam, the second light beam, the third light beam, and the fourth light beam is not fixed. The accompany drawings merely show a sequence, and the present disclosure covers other sequences that may be implemented.

The light beam adjusting element is configured to adjust propagation directions of the first light beam and the second light beam, so that the first light beam and the second light beam are input into the light splitting element.

The light beam adjusting element is preferred to be a total reflection film, or may also be a reflection film or a prism, which is not limited in the present disclosure. The light beam adjusting element may be any element that may implement adjustment of the light propagation direction. The light propagation direction may be adjusted by using total reflection of light or reflection of light, or may also be adjusted by using refraction of light. To reduce loss of light energy, a high reflection film may be coated on the light beam adjusting element.

The light splitting element may split light that is input into the light splitting element. A light splitting function of the light splitting element may be independent or have a weak dependence on a wavelength and a polarization state of light. Wavelengths and polarization states of light obtained after splitting and light before the splitting are thus the same or substantially the same.

Specifically, the first light beam is split into a fifth light beam and a sixth light beam; the second light beam is split into a seventh light beam and an eighth light beam; the third light beam is split into a ninth light beam and a tenth light beam; and the fourth light beam is split into an eleventh light beam and a twelfth light beam.

A sub light beam obtained after the first light beam is split and a sub light beam obtained after the third light beam is split are combined into one output light beam in the light splitting element. A sub light beam obtained after the second light beam is split and a sub light beam obtained after the fourth light beam is split are combined into one output light beam in the light splitting element.

Specifically, sub light beams obtained after the first light beam is split are the fifth light beam and the sixth light beam; and sub light beams obtained after the third light beam is split are the ninth light beam and the tenth light beam. A sub light beam obtained after the first light beam is split and a sub light beam obtained after the third light beam is split are combined into one output light beam in the light splitting element. It may be that the fifth light beam and the ninth light beam are combined into one output light beam; or it may be that the fifth light beam and the tenth light beam are combined into one output light beam; or it may be that the sixth light beam and the ninth light beam are combined into one output light beam; or it may be that the sixth light beam and the tenth light beam are combined into one output light beam.

Sub light beams obtained after the second light beam is split are the seventh light beam and the eighth light beam; and sub light beams obtained after the fourth light beam is split are the eleventh light beam and the twelfth light beam. A sub light beam obtained after the second light beam is split and a sub light beam obtained after the fourth light beam is split are combined into one output light beam in the light splitting element. It may be that the seventh light beam and the eleventh light beam are combined into one output light beam; or it may be that the eighth light beam and the twelfth light beam are combined into one output light beam; or it may be that the eighth light beam and the eleventh light beam are combined into one output light beam; or it may be that the eighth light beam and the twelfth light beam are combined into one output light beam.

The light splitting element splits light entering the light splitting element, some sub light beams obtained after the split are transmitted through a light splitter, and some other sub light beams obtained after the split are reflected by the light splitting element.

When multiple light beams enter the light splitting element, each light beam is separately transmitted or reflected by the light splitting element, and one combined output light beam may be obtained on a same side of the light splitting element by controlling a location and an angle of each light beam entering the light splitting element.

The light beam combining element is configured to combine the output light beams of the light splitting element into one light beam.

A sub light beam of the first light beam and a sub light beam of the third light beam are combined into one output light beam by using the light splitting element, and a sub light beam of the second light beam and a sub light beam of the fourth light beam are combined into one output light beam by using the light splitting element, so that the light splitting element outputs at least two output light beams. The light beam combining element combines the output light beams of the light splitting element into one light beam.

The first light beam, the second light beam, the third light beam, and the fourth light beam are split by the light splitting element. In the light splitting element, a sub light beam obtained after the first light beam is split and a sub light beam obtained after the third light beam is split are combined into one output light beam, and a sub light beam obtained after the second light beam is split and a sub light beam obtained after the fourth light beam is split are combined into one output light beam, so as to implement combining the four light beams into two light beams. The light beam combining element combines the two light beams output by the light splitting element into one light beam. Finally, the four light beams are combined into one light beam.

The multiplexer provided in the present disclosure is configured to receive at least four light beams of different wavelengths emitted from a laser, the light beam adjusting element is configured to adjust propagation directions of a first light beam and a second light beam, so that the first light beam and the second light beam are input into the light splitting element; the light splitting element is configured to: separately split the first light beam, the second light beam, a third light beam, and a fourth light beam, combine sub light beams obtained after the first light beam is split and sub light beams obtained after the third light beam is split into one output light beam, and combine sub light beams obtained after the second light beam is split and sub light beams obtained after the fourth light beam is split into one output light beam; and the light beam combining element is configured to combine the output light beams of the light splitting element into one light beam, thereby implementing combining the at least four light beams into one light beam.

During a process of combining at least four light beams into one light beam, a light beam is reflected four times at the light beam adjusting element, the light splitting element, and the light beam combining element; and a light beam is reflected at least zero time. When the combing at least four light beams into one light beam is implemented, the four light beams are reflected at most six times, and compared with the conventional art, not only the maximum number of reflection times of a light beam is reduced but also the total number of reflection times of the light beams is reduced, and therefore, the number of reflection times of light during the light combination process is reduced.

Figure 12:
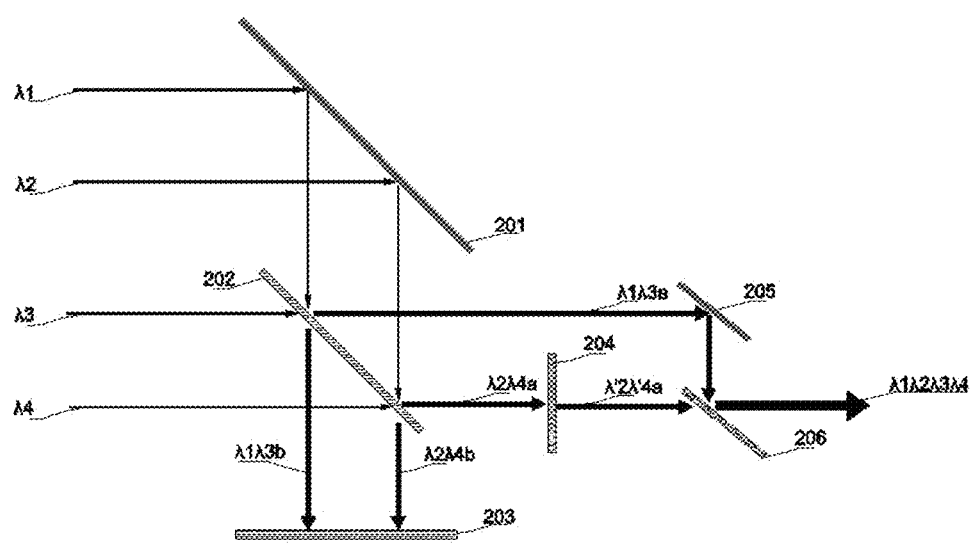
FIGS. 12-21 are schematic structural diagram of multiplexers according to other embodiments of the present disclosures. The light filtering and combining element 202 and/or 203 are replaced with a light slitting element.

FIG. 12 is a schematic structural diagram of a multiplexer according to an embodiment of the present disclosure. As shown in FIG. 12, the multiplexer according to the embodiment of the present disclosure is configured to combine at least four light beams into one light beam, where the multiplexer includes a light beam adjusting element 201, a light splitting element 202, and a light beam combining element, and the light beam combining element includes a polarization state adjusting element 204, a light reflection element 205, and a polarization beam combining element (also referred to as polarization beam combiner, light polarization and combining element) 206.

The sequence of a first light beam $\lambda 1$, a second light beam $\lambda 2$, a third light beam $\lambda 3$, and a fourth light beam $\lambda 4$ is not fixed. FIG. 12 merely shows a sequence, and the present disclosure covers other sequences that may be implemented.

The first light beam $\lambda 1$ and the second light beam $\lambda 2$ are separately propagated onto the light beam adjusting element 201 and are reflected by the light beam adjusting element 201. The third light beam $\lambda 3$ and the fourth light beam $\lambda 4$ are separately propagated onto the light splitting element 202. $\lambda 1$ not only refers to the first light beam $\lambda 1$ but also refers to a wavelength of the first light beam $\lambda 1$. Similarly, $\lambda 2$ not only refers to the second light beam $\lambda 2$ but also refers to a wavelength of the second light beam $\lambda 2$; $\lambda 3$ not only refers to the third light beam $\lambda 3$ but also refers to a wavelength of the third light beam $\lambda 3$; and $\lambda 4$ not only refers to the fourth light beam $\lambda 4$ but also refers to a wavelength of the fourth light beam $\lambda 4$.

The light beam adjusting element 201 is configured to adjust propagation directions of the first light beam $\lambda 1$ and the second light beam $\lambda 2$, so that the first light beam $\lambda 1$ and the second light beam $\lambda 2$ are input into the light splitting element 202.

The first light beam $\lambda 1$ is split into a fifth light beam and a sixth light beam, and wavelengths of the fifth light beam and the sixth light beam are the same as the wavelength $\lambda 1$ of the first light beam; the second light beam $\lambda 2$ is split into a seventh light beam and an eighth light beam, and wavelengths of the seventh light beam and the eighth light beam are the same as the wavelength $\lambda 2$ of the second light beam; the third light beam $\lambda 3$ is split into a ninth light beam and a tenth light beam, and wavelengths of the ninth light beam and the tenth light beam are the same as the wavelength $\lambda 3$ of the third light beam; and the fourth light beam $\lambda 4$ is split into an eleventh light beam and a twelfth light beam, and wavelengths of the eleventh light beam and the twelfth light beam are the same as the wavelength $\lambda 4$ of the fourth light beam.

A sub light beam obtained after the first light beam $\lambda 1$ is split and a sub light beam obtained after the third light beam $\lambda 3$ is split are combined into one output light beam in the light splitting element. A sub light beam obtained after the second light beam λ2 is split and a sub light beam obtained after the fourth light beam λ4 is split are combined into one output light beam in the light splitting element.

Specifically, sub light beams obtained after the first light beam λ1 is split are the fifth light beam and the sixth light beam; and sub light beams obtained after the third light beam λ3 is split are the ninth light beam and the tenth light beam. A sub light beam obtained after the first light beam λ1 is split and a sub light beam obtained after the third light beam λ3 is split are combined into one output light beam in the light splitting element, and a wavelength of the output light beam is λ1λ3.

It may be that the fifth light beam and the ninth light beam are combined into one output light beam; or it may be that the fifth light beam and the tenth light beam are combined into one output light beam; or it may be that the sixth light beam and the ninth light beam are combined into one output light beam; or it may be that the sixth light beam and the tenth light beam are combined into one output light beam. Specifically, after the first light beam and the third light beam are split and combined by using the light splitting element, a light beam λ1λ3a that is input into a beam combiner is formed; and sub light beams obtained after the second light beam λ2 is split are the seventh light beam and the eighth light beam; and sub light beams obtained after the fourth light beam λ4 is split are the eleventh light beam and the twelfth light beam; and a sub light beam obtained after the first light beam λ2 is split and a sub light beam obtained after the third light beam λ4 is split are combined into one output light beam in the light splitting element, and a wavelength of the output light beam is λ2λ4.

It may be that the seventh light beam and the eleventh light beam are combined into one output light beam; or it may be that the eighth light beam and the twelfth light beam are combined into one output light beam; or it may be that the eighth light beam and the eleventh light beam are combined into one output light beam; or it may be that the eighth light beam and the twelfth light beam are combined into one output light beam. Specifically, after the second light beam and the fourth light beam are split and combined by using the light splitting element, a light beam λ2λ4a that is input into a beam combiner is formed.

The light splitting element splits light entering the light splitting element, some sub light beams obtained after the split are transmitted through a light splitter, and some other sub light beams obtained after the split are reflected by the light splitting element.

When multiple light beams enter the light splitting element, each light beam is separately transmitted or reflected by the light splitting element, and one combined output light beam may be obtained on a same side of the light splitting element by controlling a location and an angle of each light beam entering the light splitting element.

Specifically, the first light beam and the third light beam are combined into the output light beam λ1λ3a on one side of the light splitting element, and are combined into an output light beam λ1λ3b on the other side of the light splitting element. The second light beam and the fourth light beam are combined into the output light beam λ2λ4a on one side of the light splitting element, and are combined into an output light beam λ2λ4b on another side of the light splitting element.

The light beam combining element is configured to combine the output light beams of the light splitting element into one light beam.

Specifically, the light beam combining element includes the polarization state adjusting element 204, the light reflection element 205, and a polarization beam combing element 206.

The output light beam λ1λ3a of the light splitting element 202 is input to the light reflection element 205, and is input to the light polarizing and combing element 206 upon reflection of the light reflection element 205. The output light beam λ2λ4a of the light splitting element 202 is input to the polarization state adjusting element 204 to obtain a light beam λ2λ4a that is input into the light polarizing and combing element 206, and the light beam λ1λ3a and the light beam λ2λ4a are combined into a light beam λ1λ2λ3λ4 in the light polarizing and combing element. The light beam λ'2λ'4a and the light beam λ2λ4a have the same wavelength and different polarization states.

A sub light beam of the first light beam λ1 and a sub light beam of the third light beam λ3 are combined into one output light beam by using the light splitting element, and a sub light beam of the second light beam λ2 and a sub light beam of the fourth light beam λ4 are combined into one output light beam by using the light splitting element, so that the light splitting element outputs at least two output light beams. The light beam combining element combines the output light beams of the light splitting element into one light beam.

In addition, the multiplexer further includes a light absorbing element 203. After the first light beam and the third light beam are split and combined by using the light splitting element, the light beam λ1λ3b that is input into the light absorbing element 203 is formed; and after the second light beam and the fourth light beam are split and combined by using the light splitting element, the light beam λ2λ4b that is input into the light absorbing element 203 is formed.

Figure 13:
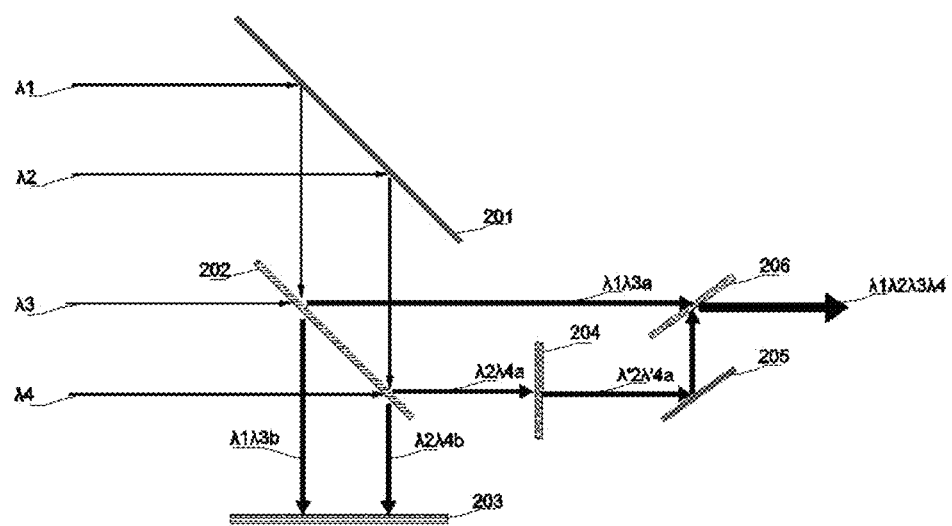

FIG. 13 is a schematic structural diagram of another multiplexer according to an embodiment of the present disclosure. As shown in FIG. 13, the multiplexer according to the embodiment of the present disclosure is configured to combine at least four light beams into one light beam, where the multiplexer includes a light beam adjusting element 201, a light splitting element 202, and a light beam combining element, and the light beam combining element includes a polarization state adjusting element 204, a light reflection element 205, and a polarization beam combining element 206.

A first light beam λ1 and a second light beam λ2 are separately propagated onto the light beam adjusting element 201 and are reflected by the light beam adjusting element 201. A third light beam λ3 and a fourth light beam λ4 are separately propagated onto the light splitting element 202. The light beam adjusting element 201 is configured to adjust propagation directions of the first light beam λ1 and the second light beam λ2, so that the first light beam λ1 and the second light beam λ2 are input into the light splitting element 202.

The first light beam λ1 is split into a fifth light beam and a sixth light beam, and wavelengths of the fifth light beam and the sixth light beam are the same as a wavelength λ1 of the first light beam; the second light beam λ2 is split into a seventh light beam and an eighth light beam, and wavelengths of the seventh light beam and the eighth light beam are the same as a wavelength λ2 of the second light beam; the third light beam λ3 is split into a ninth light beam and an tenth light beam, and wavelengths of the ninth light beam and the tenth light beam are the same as a wavelength λ3 of the third light beam; and the fourth light beam λ4 is split into an eleventh light beam and a twelfth light beam, and wavelengths of the eleventh light beam and the twelfth light beam are the same as a wavelength $\lambda 4$ of the fourth light beam.

A sub light beam obtained after the first light beam $\lambda 1$ is split and a sub light beam obtained after the third light beam $\lambda 3$ is split are combined into one output light beam in the light splitting element. A sub light beam obtained after the second light beam $\lambda 2$ is split and a sub light beam obtained after the fourth light beam $\lambda 4$ is split are combined into one output light beam in the light splitting element.

Specifically, sub light beams obtained after the first light beam $\lambda 1$ is split are the fifth light beam and the sixth light beam; and sub light beams obtained after the third light beam $\lambda 3$ is split are the ninth light beam and the tenth light beam. A sub light beam obtained after the first light beam $\lambda 1$ is split and a sub light beam obtained after the third light beam $\lambda 3$ is split are combined into one output light beam in the light splitting element, and a wavelength of the output light beam is $\lambda 1\lambda 3$; and after the first light beam and the third light beam are split and combined by using the light splitting element, a light beam $\lambda 1\lambda 3a$ that is input into a beam combiner is formed; and a sub light beam obtained after the first light beam $\lambda 2$ is split and a sub light beam obtained after the third light beam $\lambda 4$ is split are combined into one output light beam in the light splitting element, and a wavelength of the output light beam is $\lambda 2\lambda 4$; and after the second light beam and the fourth light beam are split and combined by using the light splitting element, a light beam $\lambda 2\lambda 4a$ that is input into a beam combiner is formed.

The first light beam and the third light beam are combined into the output light beam $\lambda 1\lambda 3a$ on one side of the light splitting element, and are combined into an output light beam $\lambda 1\lambda 3b$ on the other side of the light splitting element. The second light beam and the fourth light beam are combined into the output light beam $\lambda 2\lambda 4a$ on one side of the light splitting element, and are combined into an output light beam $\lambda 2\lambda 4b$ on another side of the light splitting element.

The light beam combining element is configured to combine the output light beams of the light splitting element into one light beam.

Specifically, the light beam combining element includes the polarization state adjusting element 204, the light reflection element 205, and a light polarizing and combing element 206.

The output light beam $\lambda 1\lambda 3a$ of the light splitting element 202 is input to the light polarizing and combing element 206. The output light beam $\lambda 2\lambda 4a$ of the light splitting element 202 is input to the polarization state adjusting element 204 to obtain a light beam $\lambda 2\lambda 4a$ that is input into the light polarizing and combing element 206. The light beam $\lambda 2\lambda 4a$ is input to the light reflection element 205, and is input to the light polarizing and combing element 206 upon reflection of the light reflection element. The light beam $\lambda 1\lambda 3a$ and the light beam $\lambda 2\lambda 4a$ are combined into a light beam $\lambda 1\lambda 2\lambda 3\lambda 4$ in the polarization beam combining element. The light beam $\lambda '2\lambda '4a$ and the light beam $\lambda 2\lambda 4a$ have the same wavelength and different polarization states.

A sub light beam of the first light beam $\lambda 1$ and a sub light beam of the third light beam $\lambda 3$ are combined into one output light beam by using the light splitting element, and a sub light beam of the second light beam $\lambda 2$ and a sub light beam of the fourth light beam $\lambda 4$ are combined into one output light beam by using the light splitting element, so that the light splitting element outputs at least two output light beams. The light beam combining element combines the output light beams of the light splitting element into one light beam.

In addition, the multiplexer further includes a light absorbing element 203. After the first light beam and the third light beam are split and combined by using the light splitting element, the light beam $\lambda 1\lambda 3b$ that is input into the light absorbing element 203 is formed; and after the second light beam and the fourth light beam are split and combined by using the light splitting element, the light beam $\lambda 2\lambda 4b$ that is input into the light absorbing element 203 is formed.

Figure 14:
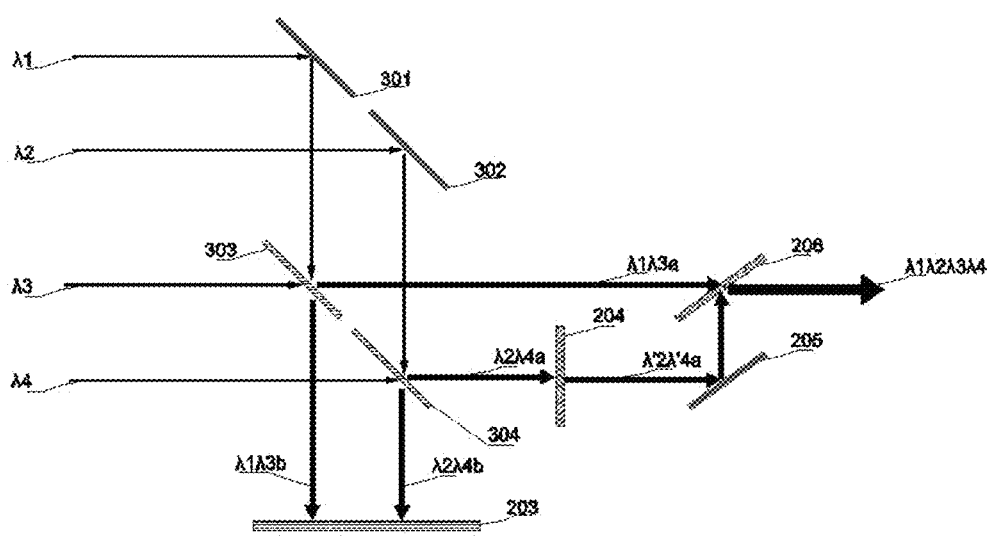

FIG. 14 is a schematic structural diagram of another multiplexer according to an embodiment of the present disclosure.

As shown in FIG. 14, a light beam adjusting element includes a first subelement 301 and a second subelement 302. The first subelement 301 is configured to adjust a propagation direction of a first light beam. The second subelement 302 is configured to adjust a propagation direction of a second light beam.

As shown in FIG. 14, a light splitting element includes a third subelement 303 and a fourth subelement 304. The third subelement 303 is configured to split the first light beam and a third light beam. The fourth subelement 304 is configured to split the second light beam and a fourth light beam.

Figure 16:
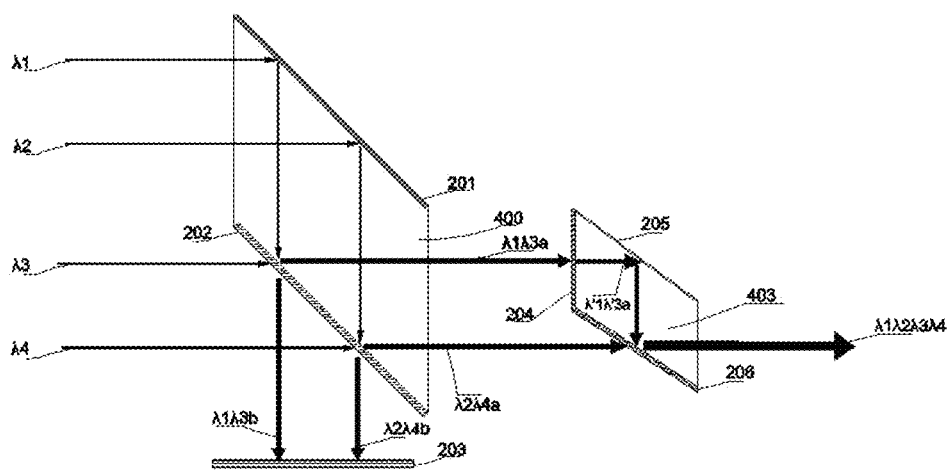
Figure 17:
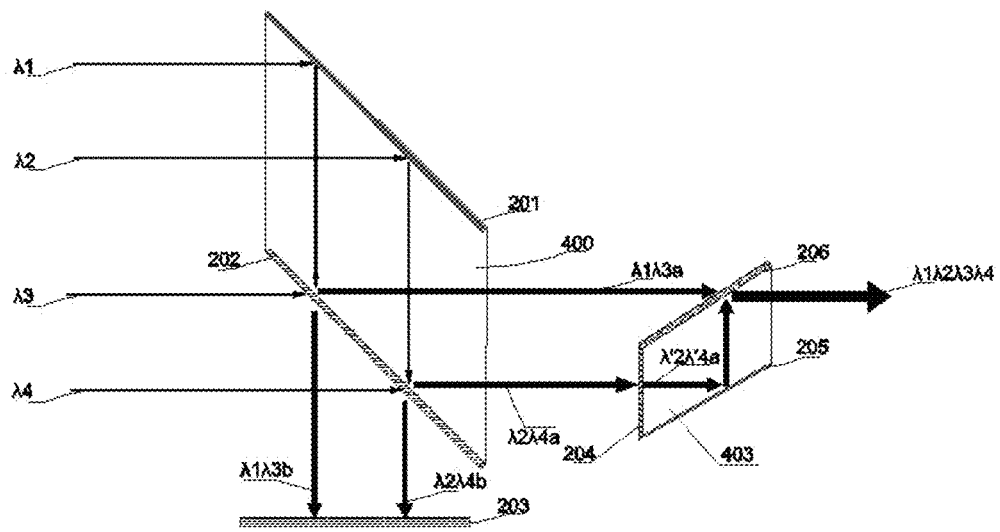

As shown in FIGS. 16 and 17, a multiplexer according to an embodiment of the present disclosure includes a first illuminator 400 and a second illuminator 403. A light beam adjusting element 201 and a light splitter 202 are attached on a surface of the first illuminator. A polarization state adjusting element 204, a light reflection element 205, and a polarization beam combining element 206 are attached on a surface of the second illuminator.

Figure 15:
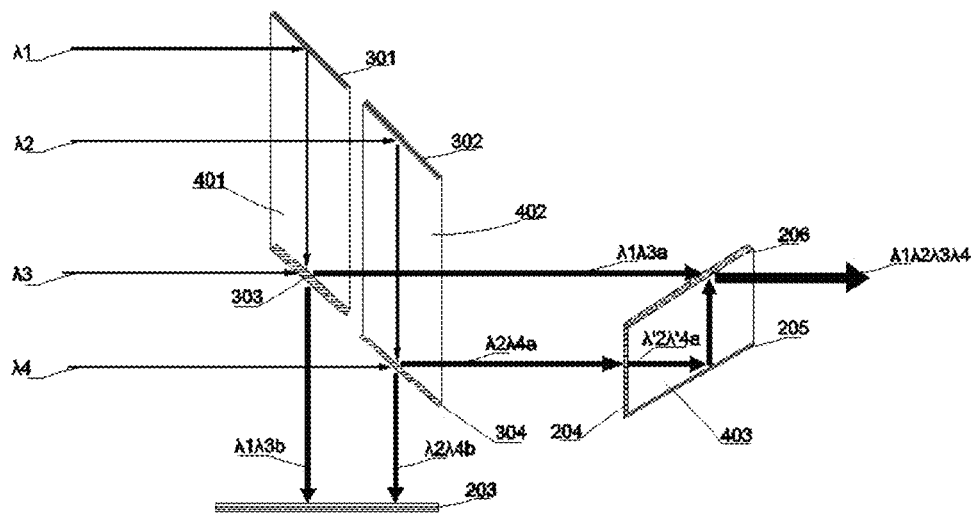

As shown in FIG. 15, a multiplexer according to an embodiment of the present disclosure includes a first illuminator 401, a second illuminator 402, and a third illuminator 403. A first subelement and a third subelement are attached on a surface of the first illuminator 401. A second subelement and a fourth subelement are attached on a surface of the second illuminator 402. A polarization state changing element, a light reflection element, and a light polarizing and combing element are attached on a surface of the third illuminator 403.

Figure 18:
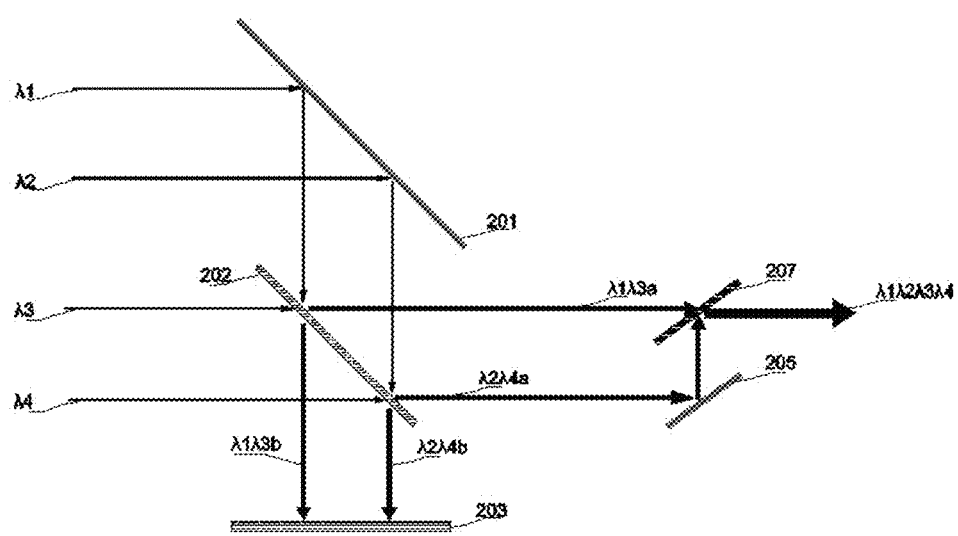

FIG. 18 is a schematic structural diagram of another multiplexer according to an embodiment of the present disclosure. As shown in FIG. 18, the multiplexer according to the embodiment of the present disclosure is configured to combine at least four light beams into one light beam, where the multiplexer includes a light beam adjusting element 201, a light splitting element 202, and a light beam combining element, and the light beam combining element includes a light reflection element 205 and a light filtering and combining element 207.

The sequence of a first light beam $\lambda 1$, a second light beam $\lambda 2$, a third light beam $\lambda 3$, and a fourth light beam $\lambda 4$ is not fixed. FIG. 18 merely shows a sequence, and the present disclosure covers other sequences that may be implemented.

The first light beam $\lambda 1$ and the second light beam $\lambda 2$ are separately propagated onto the light beam adjusting element 201 and are reflected by the light beam adjusting element 201. The third light beam $\lambda 3$ and the fourth light beam $\lambda 4$ are separately propagated onto the light splitting element 202. $\lambda 1$ not only refers to the first light beam $\lambda 1$ but also refers to a wavelength of the first light beam $\lambda 1$. Similarly, $\lambda 2$ not only refers to the second light beam $\lambda 2$ but also refers to a wavelength of the second light beam $\lambda 2$; $\lambda 3$ not only refers to the third light beam $\lambda 3$ but also refers to a wavelength of the third light beam λ3; and λ4 not only refers to the fourth light beam λ4 but also refers to a wavelength of the fourth light beam λ4.

The light beam adjusting element 201 is configured to adjust propagation directions of the first light beam λ1 and the second light beam λ2, so that the first light beam λ1 and the second light beam λ2 are input into the light splitting element 202.

The first light beam λ1 is split into a fifth light beam and a sixth light beam, and wavelengths of the fifth light beam and the sixth light beam are the same as the wavelength λ1 of the first light beam; the second light beam λ2 is split into a seventh light beam and an eighth light beam, and wavelengths of the seventh light beam and the eighth light beam are the same as the wavelength λ2 of the second light beam; the third light beam λ3 is split into a ninth light beam and an tenth light beam, and wavelengths of the ninth light beam and the tenth light beam are the same as the wavelength λ3 of the third light beam; and the fourth light beam λ4 is split into an eleventh light beam and a twelfth light beam, and wavelengths of the eleventh light beam and the twelfth light beam are the same as the wavelength λ4 of the fourth light beam.

A sub light beam obtained after the first light beam λ1 is split and a sub light beam obtained after the third light beam λ3 is split are combined into one output light beam in the light splitting element. A sub light beam obtained after the second light beam λ2 is split and a sub light beam obtained after the fourth light beam λ4 is split are combined into one output light beam in the light splitting element.

Specifically, sub light beams obtained after the first light beam λ1 is split are the fifth light beam and the sixth light beam; and sub light beams obtained after the third light beam λ3 is split are the ninth light beam and the tenth light beam. A sub light beam obtained after the first light beam λ1 is split and a sub light beam obtained after the third light beam λ3 is split are combined into one output light beam in the light splitting element, and a wavelength of the output light beam is λ1λ3.

It may be that the fifth light beam and the ninth light beam are combined into one output light beam; or it may be that the fifth light beam and the tenth light beam are combined into one output light beam; or it may be that the sixth light beam and the ninth light beam are combined into one output light beam; or it may be that the sixth light beam and the tenth light beam are combined into one output light beam. Specifically, after the first light beam and the third light beam are split and combined by using the light splitting element, a light beam λ1λ3a that is input into a beam combiner is formed; and sub light beams obtained after the second light beam λ2 is split are the seventh light beam and the eighth light beam; and sub light beams obtained after the fourth light beam λ4 is split are the eleventh light beam and the twelfth light beam; and a sub light beam obtained after the first light beam λ2 is split and a sub light beam obtained after the third light beam λ4 is split are combined into one output light beam in the light splitting element, and a wavelength of the output light beam is λ2λ4.

It may be that the seventh light beam and the eleventh light beam are combined into one output light beam; or it may be that the eighth light beam and the twelfth light beam are combined into one output light beam; or it may be that the eighth light beam and the eleventh light beam are combined into one output light beam; or it may be that the eighth light beam and the twelfth light beam are combined into one output light beam. Specifically, after the second light beam and the fourth light beam are split and combined by using the light splitting element, a light beam λ2λ4a that is input into a beam combiner is formed.

The light splitting element splits light entering the light splitting element, some sub light beams obtained after the split are transmitted through a light splitter, and some other sub light beams obtained after the split are reflected by the light splitting element.

When multiple light beams enter the light splitting element, each light beam is separately transmitted or reflected by the light splitting element, and one combined output light beam may be obtained on a same side of the light splitting element by controlling a location and an angle of each light beam entering the light splitting element.

Specifically, the first light beam and the third light beam are combined into the output light beam λ1λ3a on one side of the light splitting element, and are combined into an output light beam λ1λ3b on the other side of the light splitting element. The second light beam and the fourth light beam are combined into the output light beam λ2λ4a on one side of the light splitting element, and are combined into an output light beam λ2λ4b on another side of the light splitting element.

The light beam combining element is configured to combine the output light beams of the light splitting element into one light beam.

Specifically, the light beam combining element includes a light reflection element 205 and a light filtering and combining element 207.

The output light beam λ2λ4a of the light splitting element 202 is input into the light reflection element 205, and is input into the light filtering and combining element 207 upon reflection of the light reflection element 205. The output light beam λ1λ3a of the light splitting element 202 is input into the light filtering and combining element 207, and the light filtering and combining element 207 combines the light beam λ1λ3a and the light beam λ2λ4a into a light beam λ1λ2λ3λ4.

A sub light beam of the first light beam λ1 and a sub light beam of the third light beam λ3 are combined into one output light beam by using the light splitting element, and a sub light beam of the second light beam λ2 and a sub light beam of the fourth light beam λ4 are combined into one output light beam by using the light splitting element, so that the light splitting element outputs at least two output light beams. The light beam combining element combines the output light beams of the light splitting element into one light beam.

In addition, the multiplexer further includes a light absorbing element 203. After the first light beam and the third light beam are split and combined by using the light splitting element, the light beam λ1λ3b that is input into the light absorbing element 203 is formed; and after the second light beam and the fourth light beam are split and combined by using the light splitting element, the light beam λ2λ4b that is input into the light absorbing element 203 is formed.

Figure 19:
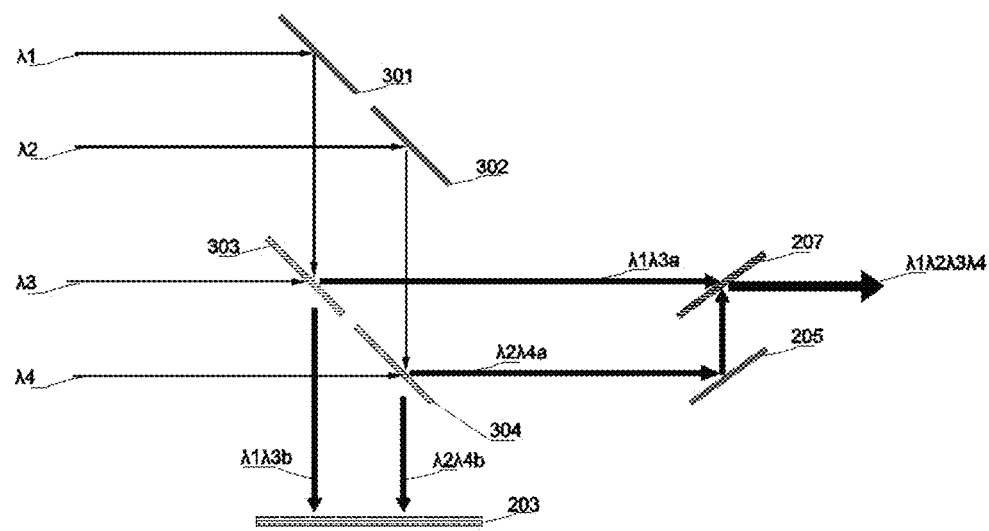

As shown in FIG. 19, a light beam adjusting element includes a first subelement 301 and a second subelement 302. The first subelement 301 is configured to adjust a propagation direction of a first light beam. The second subelement 302 is configured to adjust a propagation direction of a second light beam.

As shown in FIG. 19, a light splitting element includes a third subelement 303 and a fourth subelement 304. The third subelement 303 is configured to split the first light beam and a third light beam. The fourth subelement 304 is configured to split the second light beam and a fourth light beam.

Figure 20:
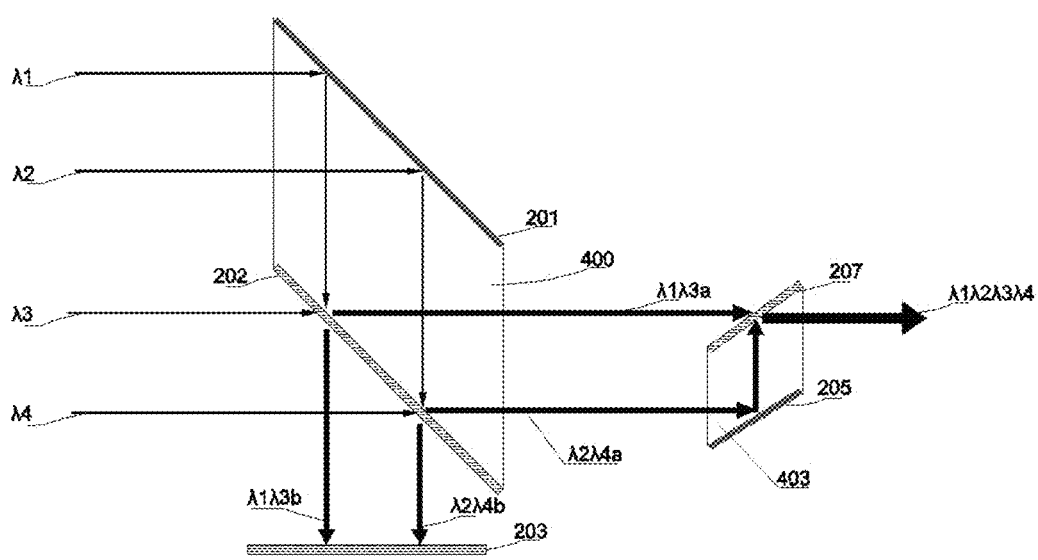

As shown in FIG. 20, a multiplexer according to an embodiment of the present disclosure includes a first illuminator 400 and a second illuminator 403. A light beam adjusting element 201 and a light splitter 202 are attached on a surface of the first illuminator. A light reflection element 205 and a light filtering and combining element 207 are attached on a surface of the second illuminator.

Figure 21:
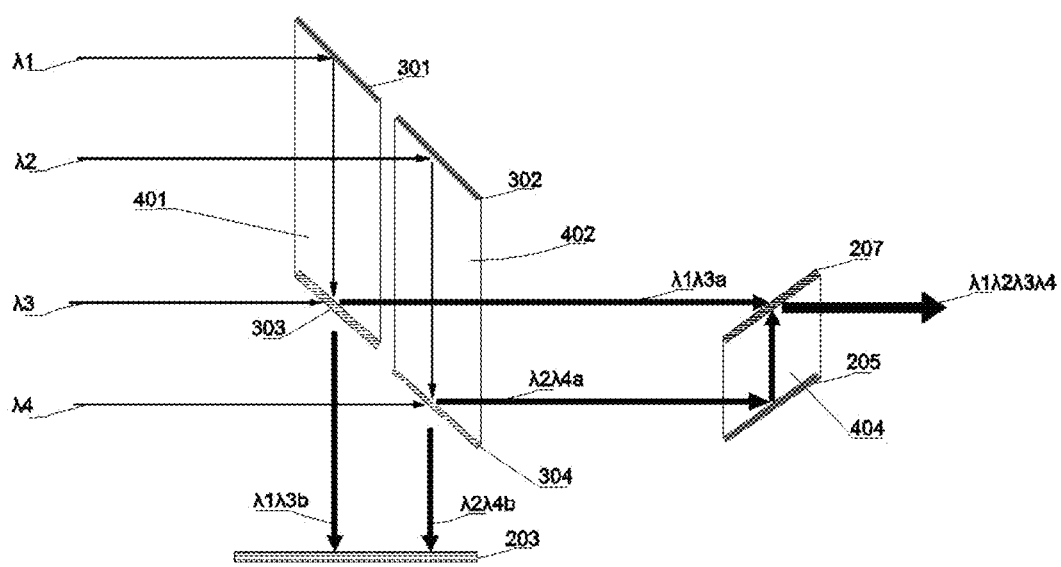

As shown in FIG. 21, a multiplexer according to an embodiment of the present disclosure includes a first illuminator 401, a second illuminator 402, and a third illuminator 404. A first subelement and a third subelement are attached on a surface of the first illuminator 401. A second subelement and a fourth subelement are attached on a surface of the second illuminator 402. A light reflection element and a light filtering and combining element are attached or coated on a surface of the third illuminator 404.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present disclosure.

What is claimed is:

1. A multiplexer for combining light beams of different wavelengths into one light beam, comprising:
   a first light beam adjusting element configured to adjust propagation directions of a first light beam and a second light beam;
   a first light splitting element configured to
     split each of the first light beam and a third light beam into two split portions;
     combine one of the two split portions of the third light beam and one of the two split portions of the first light beam adjusted by the first light beam adjusting element into a fifth light beam;
     split each of the second light beam and a fourth light beam into two split portions; and
     combine one of the two split portions of the fourth light beam and one of the two split portions of the second light beam adjusted by the first light beam adjusting element into a sixth light beam; and
   a light combining element configured to combine the fifth light beam and sixth light beam into a single light beam.

2. The multiplexer of claim 1, wherein:
   one of the two split portions of the first, second, third, or fourth beams is a transmission through the first light splitting element; and
   the other of the two split portions of the first, second, third, or fourth beams is a reflection off the first light splitting element.

3. The multiplexer of claim 1, wherein the first light splitting element comprises a first light splitting subelement and a second light splitting subelement, wherein:
   the first light splitting subelement is configured to split and combine the first light beam and the third light beam; and
   the second light splitting subelement is configured to split and combine the second light beam and the fourth light beam.

4. The multiplexer of claim 1, wherein the light combining element comprises:
   a second light adjusting element configured to adjust a propagation direction of the fifth or sixth light beam; and
   a light combining subelement configured to combine the fifth and sixth light beams after the adjustment of the propagation direction of the fifth or sixth light beams into the single light beam.

5. The multiplexer of claim 4, wherein the light combining subelement comprises a dichroic light combiner configured to combine light beams of different wavelengths.

6. The multiplexer of claim 1, wherein the light combining element comprises a polarization beam combiner.

7. The multiplexer of claim 6, further comprising a polarization state changing element disposed in the fifth or the sixth light beam between the first light splitting element and the light combining element and is configured to modify the polarization state of the fifth or the sixth light beam such that the fifth light beam and the sixth light beam are of orthogonal polarizations.

8. The multiplexer of claim 1, further comprising a light absorption element configured to absorb the other portion of the two split portions of each of the first, second, third, and fourth light beams.

9. The multiplexer of claim 1, further comprising a first illuminator comprising the first light beam adjusting element and the first light splitting element attached on a surface of the first illuminator.

10. The multiplexer according to claim 9, wherein the first illuminator further comprises an anti-reflection coating on a portion of the first illuminator to increase transmission of the first light beam, the second light beam, the fifth light beam, or the sixth light beam.

11. The multiplexer according to claim 9, further comprising a polarization state changing element attached to the surface of the first illuminator and configured to adjust polarization state of one of the fifth and the sixth light beam.

12. The multiplexer of claim 9, further comprising a second illuminator comprising the light combining element attached on a surface of the second illuminator.

13. The multiplexer according to claim 12, wherein the light combining element comprises:
   a second light adjusting element configured to adjust the propagation direction of the fifth or sixth light beam; and
   a light combining subelement configured to combine the fifth and sixth light beams after the adjustment of a propagation direction of the fifth or sixth light beams into the single light beam, and
   wherein the second light adjusting element and the light combining subelement is attached on the surface of the second illuminator.

14. The multiplexer according to claim 12, further comprising a polarization state changing element attached to the surface of the second illuminator and configured to adjust polarization state of one of the fifth or the sixth light beam.

15. The multiplexer according to claim 12, wherein the second illuminator further comprises an anti-reflection coating on a portion of the second illuminator to increase transmission of the fifth light beam, the sixth light beam, or the combined single light beam.

16. The multiplexer according to claim 1, further comprising:
   a first illuminator, wherein the first light beam adjusting element is attached on a surface of the first illuminator; and a second illuminator, wherein the first light splitting element is attached on a surface of the second illuminator.

17. The multiplexer according to claim 16, further comprising:
a first anti-reflection coating on a portion of the first illuminator to increase transmission of at least the first light beam and the second light beam; and
a second anti-reflection coating on a portion of the second illuminator to increase transmission of at least the second light beam and the first light beam.

18. The multiplexer according to claim 16, further comprising a third illuminator, wherein the light combining element is attached on a surface of the third illuminator.

19. The multiplexer of claim 1, wherein the first light adjusting element comprises a first light adjusting subelement and a second light adjusting subelement, wherein the first light adjusting subelement is configured to adjust propagation direction of the first light beam and the second light adjusting subelement is configured to adjust propagation direction of the second light beam.

20. The multiplexer of claim 19, wherein the first light splitting element comprises a first light splitting subelement and a second light splitting subelement, wherein
the first light splitting subelement is configured to split and combine the first light beam and the third light beam; and
the second light splitting subelement is configured to split and combine the second light beam and the fourth light beam.

21. The multiplexer according to claim 20, further comprising a first illuminator, wherein the first light adjusting subelement and the first light splitting subelement or the second light adjusting subelement and the second light splitting subelement are attached on a surface of the first illuminator.

22. The multiplexer according to claim 20, further comprising a second illuminator, wherein the light combining element is attached on a surface of the second illuminator.

23. The multiplexer according to claim 1, further comprising:
a first collimation element, configured to collimate, before the first light beam is input to the first light beam adjusting element, the first light beam;
a second collimation element, configured to collimate, before the second light beam is input to the first light beam adjusting element, the second light beam;
a third collimation element, configured to collimate, before the third light beam is input to the first light splitting element, the third light beam; and
a fourth collimation element, configured to collimate, before the fourth light beam is input to the first light splitting element, the fourth light beam.

24. The multiplexer according to claim 1, further comprising:
an optical isolator located after the light combining element and on a light path of the single light beam combined by the light combining element.

* * * * *